US008505045B2

(12) United States Patent
Hughes et al.

(10) Patent No.: US 8,505,045 B2
(45) Date of Patent: Aug. 6, 2013

(54) SYSTEMS AND METHODS FOR PROVIDING ADVERTISEMENTS IN A FANTASY SPORTS CONTEST APPLICATION

(75) Inventors: Patrick J. Hughes, Vienna, VA (US); Dave Barber, Tulsa, OK (US)

(73) Assignee: Rovi Technologies Corporation, Santa Clara, CA (US)

( * ) Notice: Subject to any disclaimer, the term of this patent is extended or adjusted under 35 U.S.C. 154(b) by 150 days.

(21) Appl. No.: 12/769,843

(22) Filed: Apr. 29, 2010

(65) Prior Publication Data

US 2010/0210331 A1     Aug. 19, 2010

Related U.S. Application Data

(63) Continuation of application No. 12/633,020, filed on Dec. 8, 2009, now Pat. No. 8,296,794, which is a continuation of application No. 10/234,726, filed on Aug. 30, 2002, now abandoned.

(60) Provisional application No. 60/329,587, filed on Oct. 15, 2001.

(51) Int. Cl.
*H04N 7/025*     (2006.01)
(52) U.S. Cl.
USPC ................... 725/34; 725/32; 725/36; 725/40
(58) Field of Classification Search
None
See application file for complete search history.

(56) References Cited

U.S. PATENT DOCUMENTS

| | | |
|---|---|---|
| 4,918,603 A | 4/1990 | Hughes et al. |
| 5,018,736 A | 5/1991 | Pearson et al. |
| 5,155,591 A | 10/1992 | Wachob |
| 5,263,723 A | 11/1993 | Pearson et al. |
| 5,508,731 A * | 4/1996 | Kohorn ........................... 725/24 |
| 5,589,892 A | 12/1996 | Knee et al. |
| 5,846,132 A | 12/1998 | Junkin |
| 5,860,862 A | 1/1999 | Junkin |

(Continued)

FOREIGN PATENT DOCUMENTS

| | | |
|---|---|---|
| WO | WO 01/33482 | 5/2001 |
| WO | WO 03/015403 | 2/2003 |

OTHER PUBLICATIONS

"All Pro Yearbook 1987: The Fantasy Football Magazine," All Pro Publishing Company, 1987.

(Continued)

*Primary Examiner* — Pankaj Kumar
*Assistant Examiner* — Timothy Newlin
(74) *Attorney, Agent, or Firm* — Ropes & Gray LLP

(57) ABSTRACT

Systems and methods are presented for presenting advertisements to users of a fantasy sports contest application. Advertisements are displayed in conjunction with fantasy sports contest information and may be interactive in nature. The advertisements may be used to inform the user of prizes being awarded for performance in the fantasy sports contest, including prizes being awarded for performing in an instant scoring opportunity based on real-time action in a related sports broadcast. The advertisements may be intelligently scheduled around certain events in a related sports broadcast to take advantage of user purchasing habits. The advertisements may be selected according to a user profile. The user profile may include information on the user's demonstrated interests, which may be determined using the user's preferences in the fantasy contest, prior television viewing habits, and other suitable information. The advertisements may be targeted to the user's specific geographic location. The advertisements may also be used to inform a user of an awarded prize, and to enable the user to claim the awarded prize.

18 Claims, 21 Drawing Sheets

U.S. PATENT DOCUMENTS

| | | | |
|---|---|---|---|
| 5,971,854 | A | 10/1999 | Pearson et al. |
| 6,177,931 | B1 | 1/2001 | Alexander et al. |
| 6,193,610 | B1 | 2/2001 | Junkin |
| 6,268,849 | B1 | 7/2001 | Boyer et al. |
| 6,566,068 | B2 | 5/2003 | Rabbani et al. |
| 6,698,020 | B1 | 2/2004 | Zigmond et al. |
| 6,837,789 | B2 | 1/2005 | Garahi et al. |
| 6,837,791 | B1 | 1/2005 | McNutt et al. |
| 7,001,279 | B1 | 2/2006 | Barber et al. |
| 7,548,242 | B1 | 6/2009 | Hughes et al. |
| 7,614,944 | B1 | 11/2009 | Hughes et al. |
| 2001/0036853 | A1 | 11/2001 | Thomas |
| 2001/0056577 | A1 | 12/2001 | Gordon et al. |
| 2002/0029381 | A1* | 3/2002 | Inselberg ............................ 725/9 |
| 2002/0032906 | A1* | 3/2002 | Grossman ......................... 725/42 |
| 2002/0049967 | A1* | 4/2002 | Haseltine et al. ................ 725/23 |
| 2002/0157099 | A1* | 10/2002 | Schrader et al. ................. 725/51 |
| 2003/0005437 | A1 | 1/2003 | Feuer et al. |
| 2003/0208754 | A1 | 11/2003 | Sridhar et al. |
| 2003/0208758 | A1 | 11/2003 | Schein et al. |
| 2004/0117831 | A1 | 6/2004 | Ellis et al. |
| 2009/0158374 | A1* | 6/2009 | Malaure et al. ................ 725/114 |

OTHER PUBLICATIONS

"2001 Fantasy Baseball, Help Topics," Fantasy Sports Properties, Inc. (before Dec. 2001).

"2000 Fantasy Football, Help Topics," Fantasy Sports Properties, Inc. (before Dec. 31, 2000).

"2000 Fantasy Hockey, Help Topics," Fantasy Sports Properties, Inc. (before Dec. 31, 2000).

"2000 Fantasy Basketball, Help Topics," Fantasy Sports Properties, Inc. (before Dec. 31, 2000).

BBC Sport, Fantasy Football Monthly, The Game http://bbcfootball.fantasyleague.co.uk/ et al. (accessed Sep. 17, 2002).

CBS SportsLine.com, Fantasy Baseball http://baseball101.fantasy.sportsline.com/ et al. (accessed Sep. 23-24, 2002).

CBS SportsLine.com, Fantasy Football http://football2145.fantasy.sportsline.com/ et al. (accessed Sep. 23-24, 2002).

CBS SportsLine.com, Fantasy Golf http://golf1.fantasy.sportsline.com/ et al. (accessed Sep. 23, 2002).

CBS SportsLine.com, Fantasy Hockey http://hockey2102.fantasy.sportsline.com/ et al. (accessed Sep. 23-24, 2002).

CBS SportsLine.com, Fantasy Racing http://racing.fantasy.sportsline.com/ et al. (accessed Sep. 23, 2002).

CBS SportsLine.com, John B. Sample League http://cbs.sportsline.com/ (accessed Nov. 24, 1999).

Cliff Charpentier, "1984 Fantasy Football Digest," Fantasy Sports Inc., Jun. 1984.

Cliff Charpentier, "1985 Fantasy Football Digest," Lerner Publications Company, 1985.

CNN Sports Illustrated, Fantasy Football Challenge http://football2201.si.cnn.com/ et al. (accessed Sep. 23, 2002).

CNN Sports Illustrated, Fantasy Golf Challenge http://gold5.si.cnn.com/ et al. (accessed Sep. 23, 2002).

CNN Sports Illustrated, Fantasy Nascar Challenge http://racing20.si.cnn.com/ et al. (accessed Sep. 23, 2002).

ESPN Internet Ventures, ESPN Fantasy Games http://games.espn.go.com/cgi/home/request.dll?FRONTPAGE et al. (accessed Sep. 16-18, 2002).

"Fantasy Football," Franchise Football League (before Dec. 31, 1989).

Jim Donaldson, "The Official Fantasy Football League Manual," Contemporary Books, Inc., 1985.

"Strat-O-Matic Pro Football," Strat-O-Matic Game Co., Inc. (before Dec. 31, 1994).

\* cited by examiner

| CURRENT STANDINGS | |
|---|---|
| Contestant | Pts |
| 1234 | 98 |
| 3214 | 97 |
| 4123 | 95 |
| 2134 | 90 |

BESTBOY.COM
32" TV for
Top Contest Scorer

TV BROADCAST
OF
SPORTS CONTEST

PIZZA BROTHERS

Based on your performance in the contest, we are awarding you a free pizza

[ ] 1408
Play

Your prize P.I.N. is [1234] 1450

Enter P.I.N. in promotional code box when claiming prize

[Claim prize] 1460

FIG. 14

SYSTEMS AND METHODS FOR PROVIDING ADVERTISEMENTS IN A FANTASY SPORTS CONTEST APPLICATION

CROSS REFERENCE TO RELATED APPLICATIONS

This application is a continuation of U.S. patent application Ser. No. 12/633,020, filed Dec. 8, 2009, which is a continuation of U.S. patent application Ser. No. 10/234,726, filed Aug. 30, 2002, which claims the benefit of U.S. provisional application No. 60/329,587, filed Oct. 15, 2001, each of which is hereby incorporated by reference herein in its entirety.

BACKGROUND OF THE INVENTION

This invention relates to systems and methods for providing a fantasy sports contest application, and more particularly, this invention relates to systems and methods for providing advertisements in a fantasy sports contest application.

Athletic endeavors have long supported a broad range of secondary competitions which include wagering on the outcome of particular games and wagering on the performance of a particular player.

In known fantasy sports contests, the user selects a roster, a team, a particular individual, or a group of individuals in an athletic contest. The user of a fantasy sports contest system is given the ability to take on the role of a fictional general manager with powers which may include the ability to draft, trade, dismiss and otherwise manage the player or players on the user's fantasy sports team.

Conventionally, the rules in a fantasy sports contest are set by a fantasy sports contest system provider, or are set by a league commissioner who sets the rules under which a group of fantasy or rotisserie sports game users competes against each other. For example, for every goal scored in real-life by a member of the user's fantasy soccer team, a conventional fantasy sports contest system might award five points to the user in the fantasy competition.

A provider of a conventional fantasy sports contest system may also provide additional services, which include providing statistical information on real-life games and players, tracking users' scores in the fantasy contest, and enabling transactions and other interactions among the users.

A fantasy sports contest may be based on a variety of real-life athletic events, and typically involves participants selecting players from real-life team sports (e.g., football, baseball, basketball, hockey, soccer or rugby), selecting players from real-life sports where individuals compete (e.g., golf, tennis or automotive racing), or selecting competitors from competitions involving animals (e.g., horse and dog racing). The user's selections are typically stored in the user's fantasy sports contest roster. The performance of these selections in real-life competition determines the user's performance in the fantasy sports competition.

One of the benefits of fantasy sports contests is that they provide a potentially lucrative venue for advertising, especially when implemented using an interactive application to provide the ability to be part of a fantasy sports contest via a distal medium. Presently, interactive applications accessible via the Internet using the World Wide Web are used to implement fantasy sports contests and may display advertisements to the user along with the featured content. These advertisements can be interactive in nature, and can enable the user to obtain further information on a product or service, or enable the user to purchase the product or service.

However, present fantasy sports Contest applications do not take full advantage of the information provided by the user in the process of participating in the fantasy sports contest to target advertisements toward particular users or user groups, nor do they incorporate advertisements into the fantasy sports contest to attract user attention to displayed advertisements. Further, present fantasy sports contest applications do not utilize television sports broadcasts associated with the fantasy sports contest to increase user interest in advertisements. It would therefore be desirable to provide improved ways in which to present advertisements in conjunction with a fantasy sports contest.

SUMMARY OF THE INVENTION

In view of the foregoing, it is therefore an object of the present invention to provide improved ways in which to present advertisements in conjunction with a fantasy sports contest.

This and other objects are accomplished in accordance with the principles of the present invention by providing systems and methods for displaying advertisements to a user using a fantasy sports contest application. The fantasy sports contest application may be any suitable software, hardware, or both. The fantasy sports contest application may be provided to the user using an interactive cable television system, using an Internet client/server system, using a satellite television system, or using any other suitable system. The advertisements may be distributed using systems and methods substantially equivalent to systems and methods used to distribute the fantasy sports contest application data. Alternatively, the advertisements may be distributed by any other suitable systems and methods.

The fantasy sports contest application of the present invention may be implemented on any suitable platform, or on any suitable combination of platforms. For example, in an interactive television system, the fantasy sports contest application may be implemented using a multichannel set-top box receiver, a television capable of running software programs, a two-way remote control, any other suitable device or any suitable combination of devices. At least one of the devices used in an implementation is capable of communicating advertisements to the user.

Advertisements may be simultaneously shown in advertisement regions with the user's fantasy sports contest team roster or along with other information generated by the fantasy sports contest application. The advertisements may include text messages, video, animation, static images, interactive multimedia content, links for directing users to, for example, an Internet website, any other suitable content, or any combination thereof.

The fantasy sports contest application may provide any suitable number of advertisement regions displayed in any suitable locations on a display screen. For example, the fantasy sports contest application may show an advertisement for a product or service alongside, embedded within, or as a background image of a listing of the user's fantasy sports contest team roster or current fantasy sports contest results summary screen.

The fantasy sports contest application may be invoked, used, or both by allowing the user to press one or more buttons on a remote control, by making a selection from a menu or other presentation of user-selectable choices, or by other suitable means by which a selection may be made (e.g., a speech recognition command interface). Alternately, the fantasy sports contest application may be invoked automatically.

The fantasy sports contest application may schedule advertisements to be displayed during a certain event (e.g., pre-game, half-time and post-game coverage of an athletic contest), within a particular time period of the beginning or end of the event, or both of a television sports broadcast being provided in conjunction with a fantasy sports contest. The fantasy sports contest application may select advertisements for each predefined event status in the television broadcast to increase the likelihood of a user response.

The fantasy sports contest application may personalize advertisements for the user or a group of users using user profiles. Such a user profile may include one or more kinds of information on the user such as the user's demographic data, a history of the user's past usage of the fantasy sports contest application, a history of the user's past usage of other applications (e.g., an electronic programming guide ("EPG") used to access program schedule information), a history of the user's past television viewing selections, and any other data available to advertisers through the use of data mining applications, or through the use of any other suitable technique (e.g., purchasing user data from outside vendors).

The fantasy sports contest application may display to the user local advertisements of specific local or regional interest to the user at a particular geographic location. In one suitable approach, the fantasy sports contest application may ascertain the geographic location of the network node used by the user to access the fantasy sports contest application. The fantasy sports contest application may then display advertisements that are of local interest to the user. In another suitable approach, a server at each local network node may store a bin of local advertisements that may be retrieved for display to the user upon request by user equipment, inserted into a continuous stream of advertisements for display to the user, displayed to the user using a combination of these methods, or using any other suitable method.

The fantasy sports contest application may use advertisements as an integral part of the fantasy sports contest. For example, notification of the one or more prizes that the user may win in an advertiser-sponsored fantasy sports contest may be through an advertisement. For example, the fantasy sports contest application may allow the user who is among the leaders in a fantasy sports contest to receive an electronic message, telephone call, or personalized advertisement notifying the user to call a certain number, or to select the displayed advertisement to claim the prize. To prevent more than one claimant for a prize, the fantasy sports contest application may use one or more personal identification numbers (also known as PINs) or passwords. For example, once a PIN or password has been used in a contest or promotion, no other claimant would then be able to use that PIN or password to collect a prize.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows an illustrative display screen having an advertisement informing the user of a prize being awarded in the fantasy sports contest in accordance with one embodiment of the present invention;

FIG. 14 shows an illustrative display screen informing a user of a prize he has won and the prize PIN or prize password being assigned to that prize in accordance with one embodiment of the present invention;

DETAILED DESCRIPTION OF THE INVENTION

Figure 1:
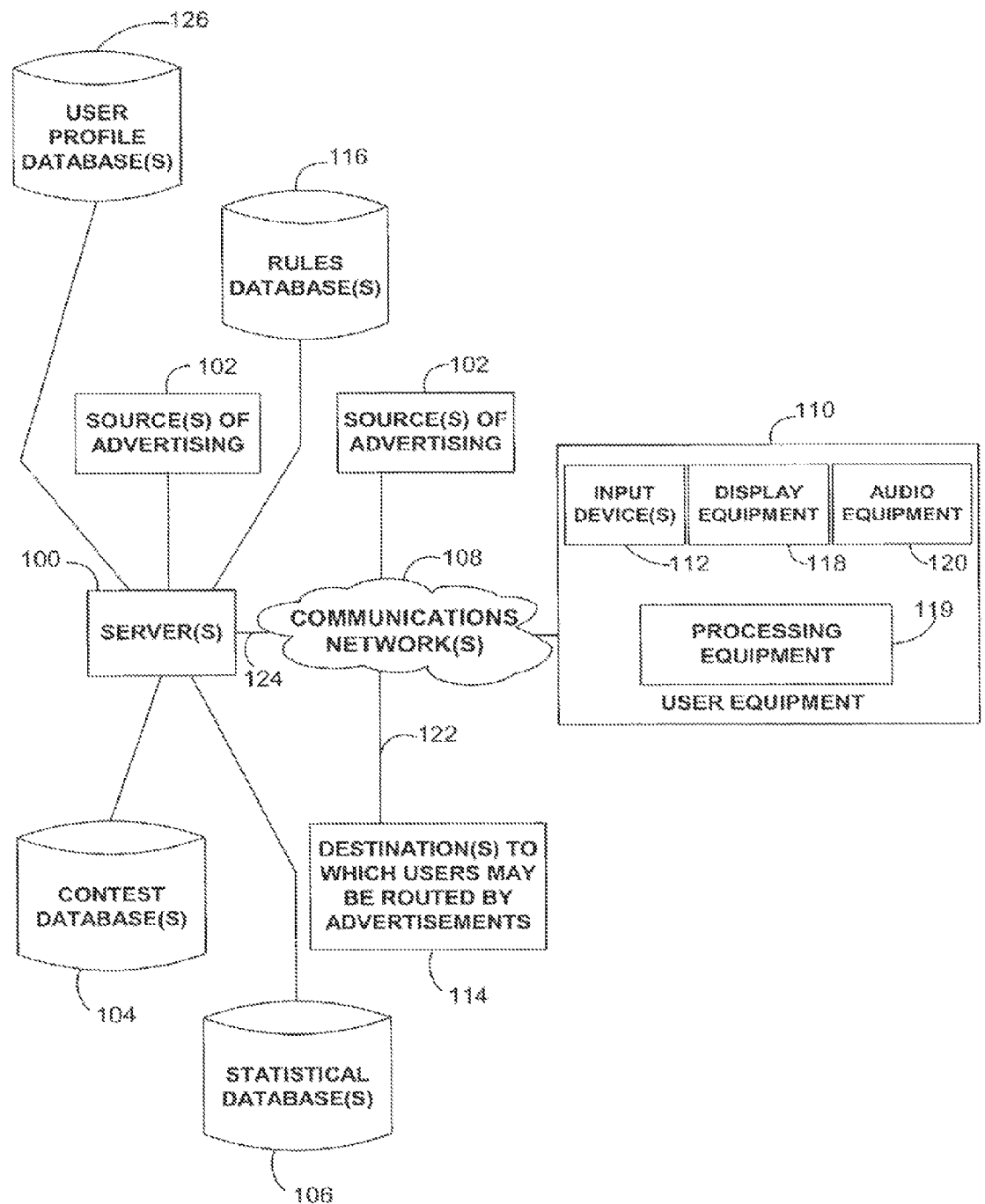
FIG. 1 is a diagram of an illustrative client/server system in accordance with one embodiment of the present invention.

The present invention is primarily described herein in terms of the fantasy sports contest application. It will be understood that any other suitable software, hardware, or both may be used in conjunction with the fantasy sports contest application or in place of the fantasy sports contest application to implement some or all of the features of the present invention.

The fantasy sports contest application of the present invention may be any suitable software, hardware, or both that may be used to implement the features of the present invention. The fantasy sports contest application may be implemented at any suitable location in the system described in FIG. 1. For example, the fantasy sports contest application may be implemented at user equipment 110, at server 100, or at any other suitable location (that is not necessarily shown in FIG. 1), or at any combination of locations. For example, certain portions of the fantasy sports contest application may be implemented at user equipment 110 (e.g., those portions that implement features involved in user interaction), whereas certain other portions of the fantasy sports contest application may be implemented at server 100 (e.g., those portions that implement features involved in the processing of client requests and in the tracking of the performance of contestants). Any such suitable arrangement of the fantasy sports contest application may be implemented in accordance with the present invention.

The fantasy sports contest application of the present invention may be used to implement fantasy sports contests that include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting player positions, selecting reserves, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, multiple seasons, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basis of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). There are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest information. Fantasy sports contest information may include any suitable information associated with one or more fantasy sports contests in which the user participates or in which the user may have an interest. For example, fantasy sports contest information may include information regarding the user's one or more rosters, the user's standing in each of the fantasy sports contests in which the user participates, one or more point tallies that the user has accumulated in each of the user's respective fantasy sports contests, information regarding the number of trades the user may make, information regarding the amount of fantasy money the user has available to add players to a roster, information regarding deadlines to make trades or perform any other suitable task associated with one or more fantasy sports contests, or any other suitable information. Fantasy sports contest information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contest in which the user participates.

Aspects of the operation of fantasy sports contest applications are described in U.S. Pat. No. 4,918,603 (Hughes, et al.), U.S. Pat. No. 5,846,132 (Junkin), U.S. Pat. No. 5,971,854 (Junkin), and U.S. Pat. No. 6,193,610 (Junkin), which are all hereby incorporated by reference herein in their entireties.

An illustrative client/server system in accordance with the present invention is shown in FIG. 1. The system illustrated in FIG. 1 may be used as a fantasy sports contest system in accordance with the present invention. A fantasy sports contest application may be at least partially implemented on server 100.

Server 100 may include one or more servers that may be located at a single location or across two or more locations (e.g., in a distributed network arrangement). Server 100 may access one or more databases (e.g., databases 104, 106, 116, and 126) that may store information related to a fantasy sports contest. Databases 104, 106, and 116 may store fantasy sports contest information such as the roster of players available for drafting, the schedule for the fantasy sports contest, fantasy sports contest rules, or any other suitable information related to the fantasy sports contest. Database 126 may store user profiles on the users of the fantasy sports contest, which may include information for determining the users' preferences.

Alternatively, user profiles may be stored locally at user equipment 110. Server 100 may also include a source of advertising 102 for providing advertisements and related information. Information from server 100 and source 102 may be transmitted to user equipment 110 via communications network 108. Communication network 108 may be a satellite network, a telephone network, an Internet network, a cable network, or any other suitable communication network. If it is desired to transmit video signals over communication network 108, a network that enables relatively high bandwidth transmission (e.g., cable network, satellite network) may be desirable.

The fantasy sports contest information transmitted by server 100 to user equipment 110 includes data which is communicated to users as part of the fantasy sports contest such as statistical information, rosters, standings, etc. The advertising information transmitted by server 100 to user equipment 110 includes text, graphics, and video advertisements for various products and services. If desired, some of the fantasy sports contest information and advertising information may be provided using data sources at facilities other than server 100, which are directly connected to user equipment 110 via communications network 108.

For example, data related to tracking user interaction with the fantasy sports contest application and other applications may be communicated to a data collection location that is separate from server 100. Similarly, advertising information may be generated by an advertising facility that is separate from server 100.

Server 100 may distribute the fantasy sports contest application and related data as well as advertisements and related data to user equipment 110 via communication network 108.

User equipment 110 at each user's location may include processing equipment 119. Processing equipment 119 may be based on a personal computer, a WebTV box, a personal computer television (PC/TV), a handheld computing device, a PC tablet, etc. Processing equipment 119 may be used to implement the fantasy sports contest application at the user's location. Alternately, the fantasy sports contest application may be partially implemented on server 100 and partially implemented on processing equipment 119.

Fantasy sports contest information may be distributed to user equipment 110 periodically (e.g., once per hour or once per week). Fantasy sports contest information may also be distributed continuously or on-demand to user equipment 110. A connection may be established to server 100, and any sources of information independent from server 100 through communications network 108. The fantasy sports contest application may request certain fantasy sports contest information, advertisements, and advertisement related information to be sent from server 100 and independent sources. Server 100 may include a processor to handle these information distribution tasks. User processing equipment 119 may also include a processor to handle tasks associated with implementing a fantasy sports contest application, including requesting appropriate information from server 100.

Server 100 may include database 126 for storing user profiles of the fantasy sports contest users. A user profile may include any suitable information that may help determine the user's preferences and may include information on the user's demographics data, the user's interaction history with the fantasy sports contest application and other interactive applications (e.g., electronic program guide application ("EPG")). Information such as the contents of the user's fantasy sports contest team roster, the frequency with which the user views highlight reels of a certain team, the history of past purchases made by the user through interactive advertisements in the fantasy sports contest application may all be included in the user profile. In addition, information on the television viewing habits of the user, the Internet web browsing favorites of the user, and other related information may also be included in the user profile.

At user equipment 110, display equipment 118 displays fantasy sports contest information and advertisements. The fantasy sports contest information and advertisements may include audio information. Audio equipment 120 may be used to output audio info. Audio equipment may include speakers found in televisions, speakers for personal computers, or any other suitable audio equipment. The user may use input device 112 to access information related to the fantasy sports contest. Such input devices may include one or more suitable devices such as remote controls, keyboards, voice controlled devices, track balls, computer mice or any other suitable device.

Certain functions such as the user's instructions to make a change in roster choices and the monitoring of the user's use of the fantasy sports contest application may require user equipment 110 to transmit data to server 100 over communication network 108. If desired, such data may be transmitted using a communications network separate from communications network 108 used for fantasy sports contest information and advertising data. If functions such as these are provided using communications networks separate from network 108, some communications originating from user equipment 110 may be made directly with the separate networks.

A number of suitable techniques may be used to distribute graphics information for advertisements. For example, graphics information may be distributed from source 102 in a continuously-looped arrangement, where the fantasy sports contest application implemented on user processing equipment 119 may capture appropriate advertisements for display from the stream of information being transmitted. With such a continuously-looped arrangement, a map indicating the location of the latest graphics information may be downloaded periodically to user equipment 110. This allows any databases used in source 102 for storing advertisements to be updated, and also allows source 102 to be changed. Graphics information may be downloaded to user equipment 110 periodically and stored locally. The graphics information may be accessed locally when needed by the fantasy sports contest application implemented (at least partially) using processing equipment 119 at the user's location. Another approach involves using the fantasy sports contest application to request graphics information when needed. Information on the location of graphics information may be downloaded to user equipment 110, and may be updated as needed. The fantasy sports contest application implemented (at least partially) using processing equipment 119 may then request and receive appropriate graphics information as needed.

Text information for advertisements may be provided to user equipment 110 using paths that are substantially equivalent to the paths used for distributing fantasy sports contest information. For example, text information may be stored locally in processing equipment 119 and updated periodically. Text information may also be provided by server 100 using a continuously-looped arrangement, or on request.

When an advertisement is interactive, the user may select the advertisement and may, as a result, access (e.g., via communication paths 122 or 124) one or more destinations such as an advertiser's Internet website, an advertiser's product ordering database, etc. The location accessed by the user may be fixed according to information associated with the selected advertisement, may be system selected, or may be a function of some data the user has provided.

Figure 2:
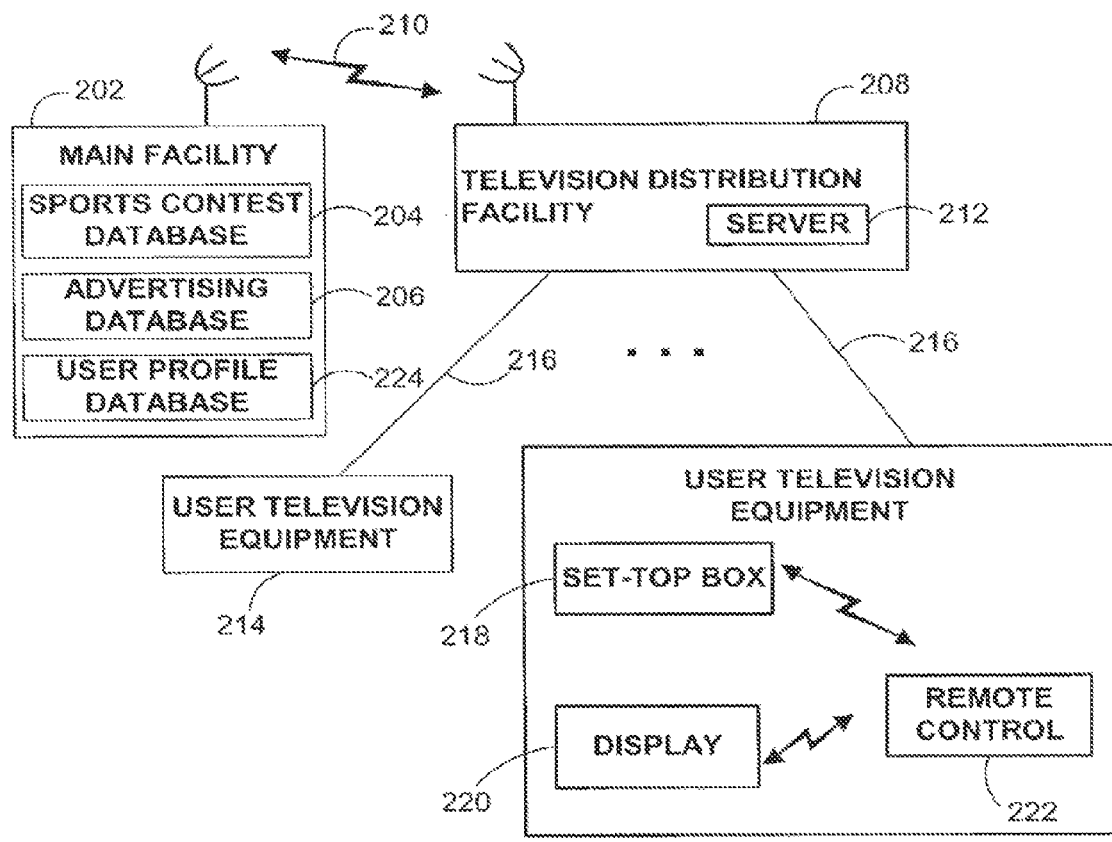
FIG. 2 is a diagram of an illustrative interactive television system in accordance with one embodiment of the present invention.

In one embodiment, the fantasy sports contest application of the present invention may be implemented on an interactive television platform. An illustrative fantasy sports contest system in accordance with this embodiment of the present invention is shown in FIG. 2. Main facility 202 may include a fantasy sports contest database 204 for storing fantasy sports contest information such as the roster of players available for drafting, the schedule for the contest, rules, or any other suitable fantasy sports contest information. Main facility 202 may also include an advertising database 206 for storing advertisement information and user profile database 224 for storing user profiles. Information from databases 204, 206, and 224 may be transmitted to television distribution facility 208 via communications link 210. Link 210 may be a satellite link, a telephone network link, an Internet link, a cable or fiber optic link, a microwave link, a combination of such links, or any other suitable communications link. If it is desired to transmit video signals (e.g., for advertising and promotional videos) over link 210 in addition to data signals, a relatively high bandwidth link such as a satellite link may be preferable to a relatively low bandwidth link such as a telephone line.

Television distribution facility 208 is a facility for distributing television signals to users, such as a cable system head end, a broadcast distribution facility, or a satellite television distribution facility.

The fantasy sports contest information transmitted by main facility 202 to television distribution facility 208 includes data which is communicated to users as part of the contest such as statistical information, rosters, standings, etc. The advertising information transmitted by main facility 202 to television distribution facility 208 includes text, graphics, and video advertisements for various products and services. If desired, some of the contest and advertising information may be provided using data sources at facilities other than main facility 202.

For example, data related to tracking player interaction with the fantasy sports contest application and other applications may be communicated to a data collection location that is separate from main facility 202 and separate from television distribution facility 208. Similarly, advertising information may be generated by an advertising facility that is separate from main facility 202 and television distribution facility 208.

Regardless of its source, advertising information may be maintained on a server 212 within television distribution facility 208 if desired. Server 212 may be capable of handling text, graphics, and video. In addition, server 212 may be capable of providing interactive services such as handling the ordering of products and services advertised via interactive advertisements. Server 212 may be based on one or more computers.

Television distribution facility 208 may distribute fantasy sports contest information and applications as well as advertising data and applications to user television equipment 214 or other user equipment via communications paths 216. This information may be distributed over an out-of-band channel on paths 216 and may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels on paths 216. Such digital channels may also be used for distributing text and graphics.

Each user may have a receiver such as set-top box 218 or other suitable television or computer equipment into which circuitry similar to set-top box circuitry has been integrated. For clarity, the present invention is described primarily in connection with user equipment based on a set-top box arrangement. This is merely illustrative. The fantasy sports contest may be implemented using user television equipment 214 that is based on a personal computer, a WebTV box, a personal computer television (PC/TV), or handheld computing device, etc. If desired, the fantasy sports contest may be implemented using a client-server architecture using user television equipment 214 as a client processor and a server such as server 212.

Fantasy sports contest information may be distributed to set-top box 218 periodically (e.g., once per hour or once per week). Fantasy sports contest information may also be distributed continuously or on-demand. A connection may be established to television distribution facility 208 using communication link 210. A request for certain fantasy sports contest information or advertisement information may be sent from set-top box 218 to television distribution facility 208. Television distribution facility 208 may respond by sending information responsive to the request back to set-top box 218 using communications link 216. Main facility 202 may include a processor to handle information distribution tasks. Each set-top box 218 may include a processor to handle tasks associated with implementing a fantasy sports contest application on set-top box 218. Television distribution facility 208 may include a processor for tasks associated with monitoring the user's interactions with the fantasy sports contest implemented on set-top box 218 and for handling tasks associated with the distribution of information related to the fantasy sports contest and associated advertisements.

During use of the fantasy sports contest application implemented, at least in part, on set-top box 218, statistical information relating to the fantasy sports contest may be displayed on display 220. Set-top box 218, and display 220, which may be part of a television, may be controlled by one or more remote controls 222 or any other suitable user input interfaces such as a wireless keyboard, a mouse, a trackball, a dedicated set of buttons, etc.

Communications paths 216 preferably have a sufficient bandwidth to allow television distribution facility 208 to distribute scheduled television programming, pay programming, advertisements, promotional product videos, and other video information to set-top box 218 in addition to the fantasy sports contest application and related data. Multiple television and audio channels (analog, digital, or both analog and digital) may be provided to set-top box 218 via communications paths 216. If desired, fantasy sports contest and advertising information may be distributed by one or more distribution facilities that are similar to, but separate, from television distribution facility 208 using communications paths that are separate from communications paths 216 (e.g., using Internet paths).

Certain functions such as the user's instructions to make a change in the user's roster choices may require set-top box 218 to transmit data to television distribution facility 208 over communications paths 216. If desired, such data may be transmitted over telephone lines or other separate communications paths. If functions such as these are provided using facilities separate from television distribution facility 208, some of the communications involving set-top box 218 may be made directly with the separate facilities.

A number of suitable techniques may be used to distribute advertisements. For example, if each path 216 includes a number of traditional analog television channels, one or more of these channels may be used to support a number of digital channels. The bandwidth of each analog channel that is used to support digital channels may support ten or more of such digital channels. If desired, advertisement videos may be provided from server 212 or other suitable equipment at television distribution facility 208 in a continuously-looped arrangement on these digital channels. Information provided to set-top box 218 may then be used to determine which digital channels to tune to when it is time to display a desired video. Alternatively, videos may be provided on demand. With this approach, set-top box 218 and server 212 may negotiate to determine a channel on which to provide the desired video. Videos that originate from main facility 202 or a separate facility may be distributed to user television equipment 214 using these or other suitable techniques or a combination of such techniques.

Figure 3:
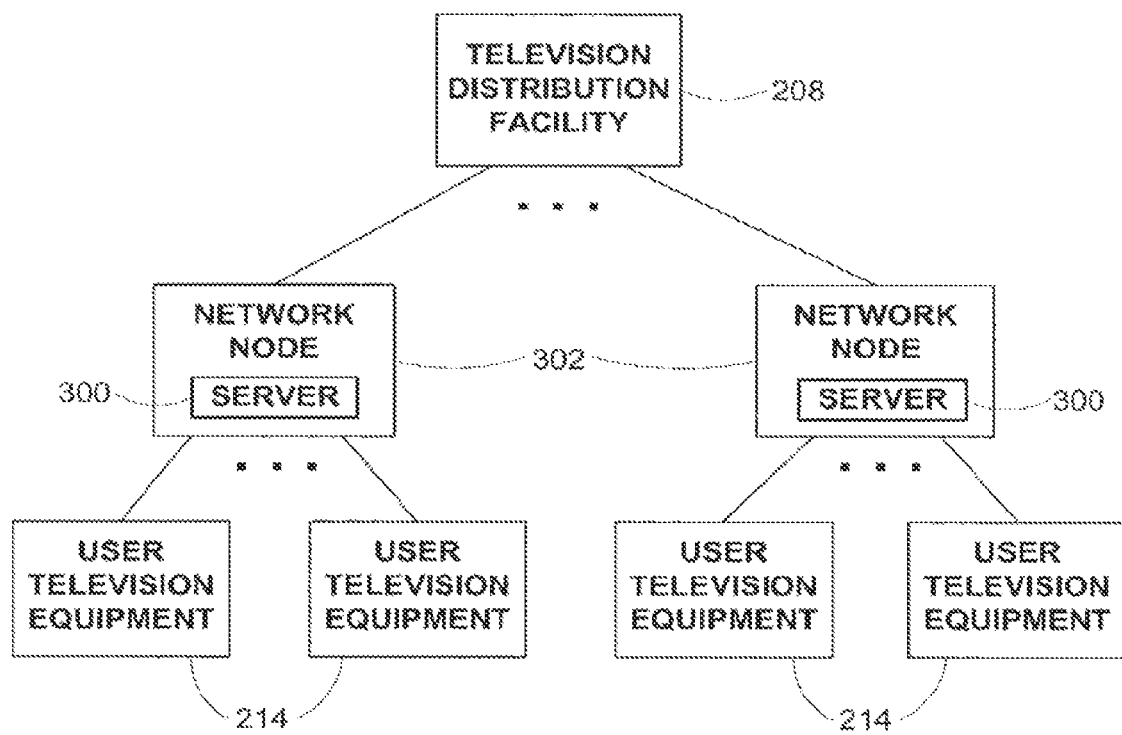
FIG. 3 is a diagram of an illustrative interactive television system having network nodes in accordance with one embodiment of the present invention.

As shown in FIG. 3, the capabilities of server 212 at television distribution facility 208 may be distributed to servers 300 located at network nodes 302. Servers such as servers 300 may be used instead of server 212 or may be used in conjunction with a server 212 located at television distribution facility 208.

Graphics information for advertisements may be downloaded periodically (e.g., once per day) to set-top box 218 of FIG. 2 and stored locally. The graphics information may be accessed locally when needed by the fantasy sports contest application implemented (at least partially) using set-top box 218. Alternatively, graphics information may be provided in a continuously-looped arrangement on one or more digital channels on paths 216. With such a continuously-looped arrangement, a map indicating the location of the latest graphics information may be downloaded periodically to set-top box 218 (e.g., once per day). This allows the content on the digital channels to be updated. The fantasy sports contest application on set-top box 218 may use the map to locate desired graphics information on the digital channels. Another approach, involves using a server such as server 212 or servers 300 (FIG. 3) to provide the graphics information on request (e.g., after set-top box 218 has negotiated with that server to set up a download operation). A bitmap or other suitable set of graphics information may then be downloaded from the server to set-top box 218. If desired, the server may provide instructions to set-top box 218 informing set-top box 218 where the desired graphics information is located on a particular digital channel. The graphics information may be updated periodically if the server that is responsible for providing the instructions for informing the set-top box of the location of the graphics information is also updated periodically.

Text information for advertisements may be provided to set-top box 218 using paths that are substantially equivalent to the paths used for distributing fantasy sports contest information. For example, advertising data from database 206 of FIG. 2 may be provided to set-top box 218 using link 210, television distribution facility 208, and paths 216. The text information may be stored locally in set-top box 218 and updated periodically (e.g., once per day). Text information may also be provided by server 212 using a continuously-looped arrangement or on request.

A cable modem may be used to distribute texts, graphics, and videos. Text information, graphics information, and videos for advertisements may also be distributed using a combination of these techniques or any other suitable technique.

Figure 4:
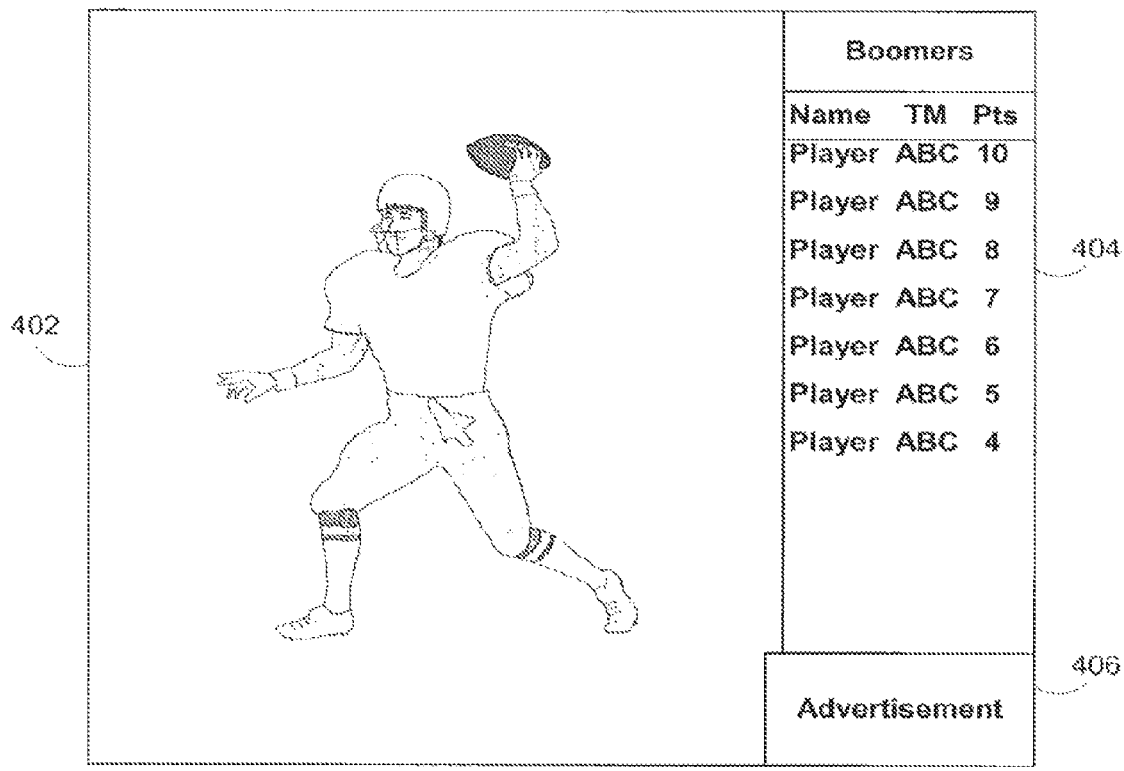
FIG. 4 shows an illustrative display screen having a partially transparent fantasy sports contest information region and an advertisement region overlaid on a television sports broadcast in accordance with one embodiment of the present invention.

As shown in FIG. 4, the fantasy sports contest application may provide illustrative display screen 400 having partially transparent fantasy sports contest information region 404 and advertisement region 406 overlaid on television broadcast 402 shown in FIG. 4. As shown in FIG. 4, fantasy sports contest information region 404 may display fantasy sports contest information such as the user's team roster and the fantasy points scored by each player on the team roster. Television broadcast 402 may be a broadcast of a real-life sports contest related to the fantasy sports contest, or may be an unrelated television broadcast. For example, fantasy sports contest information region 404 may display fantasy football contest information simultaneously with the broadcast of a real-life football contest.

FIG. 4 shows merely an illustrative arrangement. It will be understood that any other suitable arrangement may be used. For example, fantasy sports contest information region 404 may be displayed in any suitable form, such as not transparent, more transparent, full-screen, in a smaller portion of the screen, in any suitable shape, as only text (i.e., without background), or in any other suitable form. Advertisement region 406 may likewise be displayed in any suitable form. In one suitable arrangement broadcast 402 may be reduced such that broadcast 402 may be viewed substantially unobscured simultaneously with fantasy sports contest information region 404 and advertisement region 406.

Figure 5:
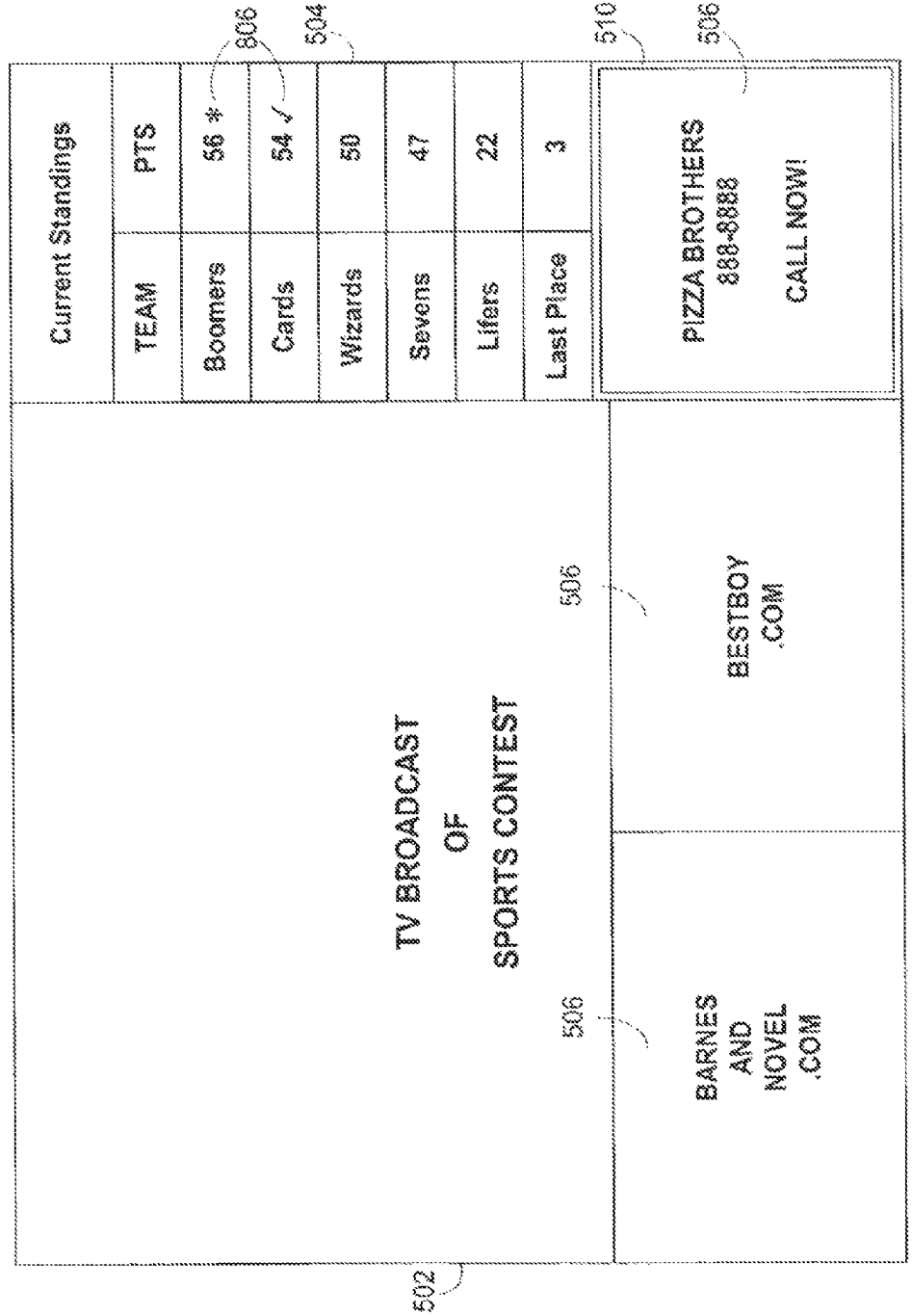
FIG. 5 shows an illustrative display screen having a fantasy sports contest information region and multiple advertisement regions displayed simultaneously with a reduced size television sports broadcast in accordance with one embodiment of the present invention.

For example, in another suitable arrangement, the fantasy sports contest application may provide a display screen as illustrated in FIG. 5. FIG. 5 shows display screen 500 having a fantasy sports contest information region 504 displaying point standings of the user's field of competition. Fantasy sports contest information region 504 may be displayed as an opaque region. Multiple advertisement regions 506 may be displayed to provide multiple advertising opportunities on a single display screen. As shown, advertisement regions 506 are opaque. If desired, one or more of advertisement regions may be semi-transparent, or in any other suitable form. If desired, each of advertisement regions 506 may be displayed in a different form from the others.

In one suitable arrangement, the fantasy sports contest application may display multiple fantasy sports contest information regions and advertisement regions throughout a display. For example, one or more fantasy sports contest information regions may be used to display information related to rosters, whereas one or more other fantasy sports contest information regions may be used to display information related to fantasy sports contest league standings, or any other suitable information.

Figure 6:
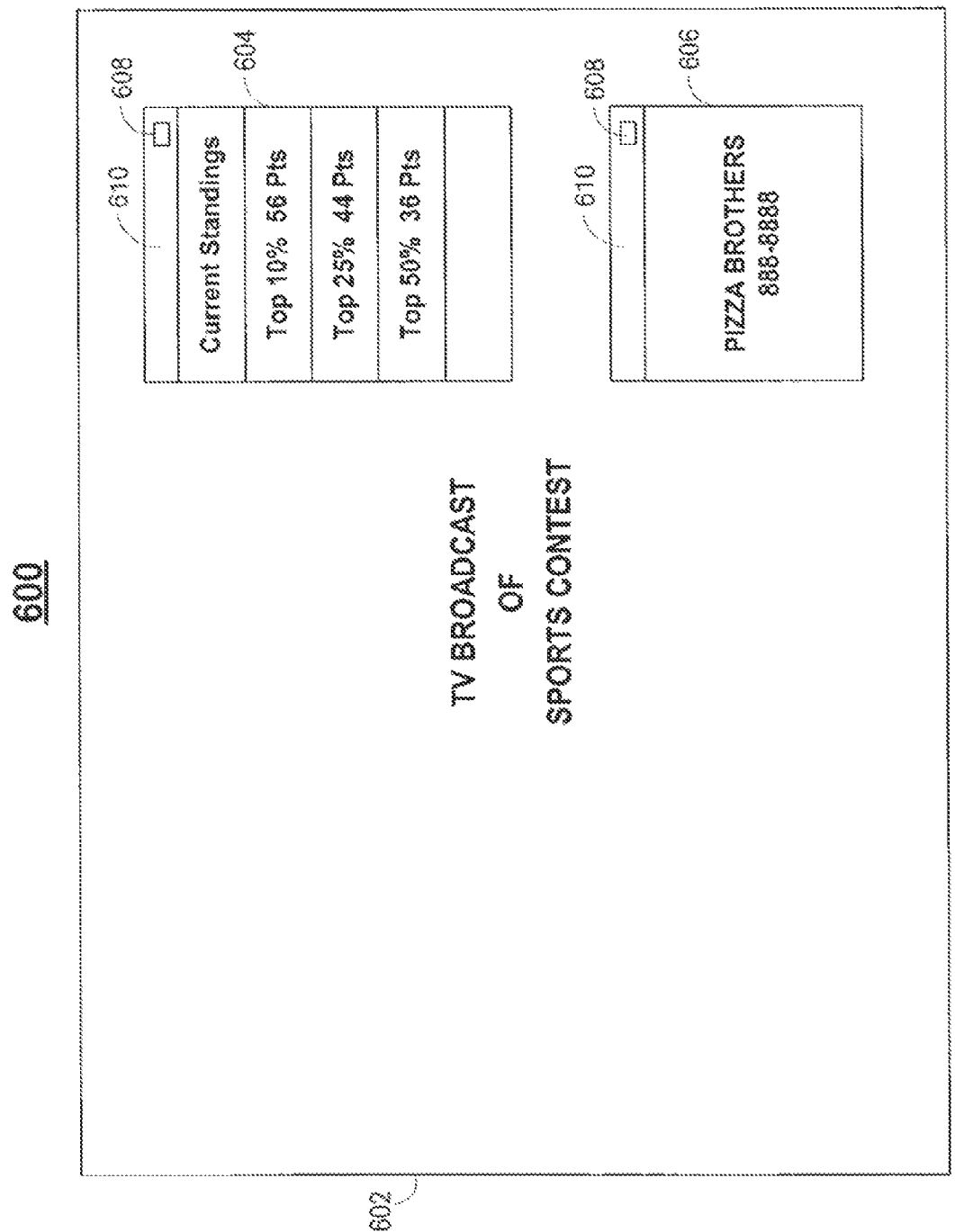
FIG. 6 shows an illustrative display screen having a display bar overlaid on a television sports broadcast, the display bar having a fantasy sports contest information region and an advertisement region in accordance with one embodiment of the present invention.

FIG. 6 shows an illustrative display screen 600 where fantasy sports contest information is displayed in fantasy sports contest information region 604 as an overlay over related television broadcast 602 and advertisements are displayed in advertisement region 606 as an overlay over related television broadcast 602. Regions 604 and 606 may be in the form of windows. For example, if the fantasy sports contest application is being accessed from personal computer-based user equipment, then one or more regions may be displayed in the form of windows such as in Microsoft™ Windows or Apple™ OS display environments. For example, if windows, regions 604 and 606 may be minimized, moved, resized, closed, or otherwise manipulated in any suitable way using, for example, selectable elements 608 and 610. In the case of advertisement regions, the fantasy sports contest application may prohibit the user from removing or minimizing advertisement regions.

It will be understood that a window arrangement may be used in a television-based user equipment arrangement as well. In this case, the user preferably may use a pointing device such as a mouse, trackball, touch-pad, or any other suitable pointing device to move a pointer or any other suitable navigation tool on the display screen to manipulate the windows and perform any other suitable function typically performed using a pointing device.

In one suitable arrangement, fantasy sports contest information regions 604 and advertisement regions 606 may be displayed over broadcast 602 for a preset period, of time when a preset condition is met, such as when the fantasy sports contest information to be displayed in region 604 is updated, or when the user wins a prize in the fantasy sports contest. In another suitable arrangement, fantasy sports contest information regions 604 and advertisement regions 606 may each be displayed on a preset schedule and for a preset period of time at each scheduled display.

In general, each display screen in accordance with the present invention may have more than one advertisement region, more than one fantasy sports contest information region, and optionally the display of a fantasy sports contest related television broadcast, or any other suitable information. Advertisement regions and fantasy sports contest information regions may be semi-transparent overlays, opaque overlays obscuring a portion of the television display screen, displays in a reduced screen format that allows the entire content of the television display to be viewed in a reduced screen, or any other suitable alternative display.

The fantasy sports contest application may allow any or all advertisement regions to be selectable. The user may select an advertisement region using any suitable technique. For example, as shown in FIG. 5, highlight region 510 may be used in conjunction with user equipment, such as a remote control, to select a particular advertisement region 506.

In one suitable approach, the fantasy sports contest application may provide advertisements having selectable content within the advertisements themselves. In this situation, the fantasy sports contest application may allow the user to navigate a highlight region (e.g., highlight region 510) to both the advertisement region in which the advertisement is displayed and then to the selectable elements of the advertisement, or only to the selectable elements of the advertisement (i.e., not allowing the advertisement region as a whole to be selected). Any such suitable selection technique may be used.

Figure 7:
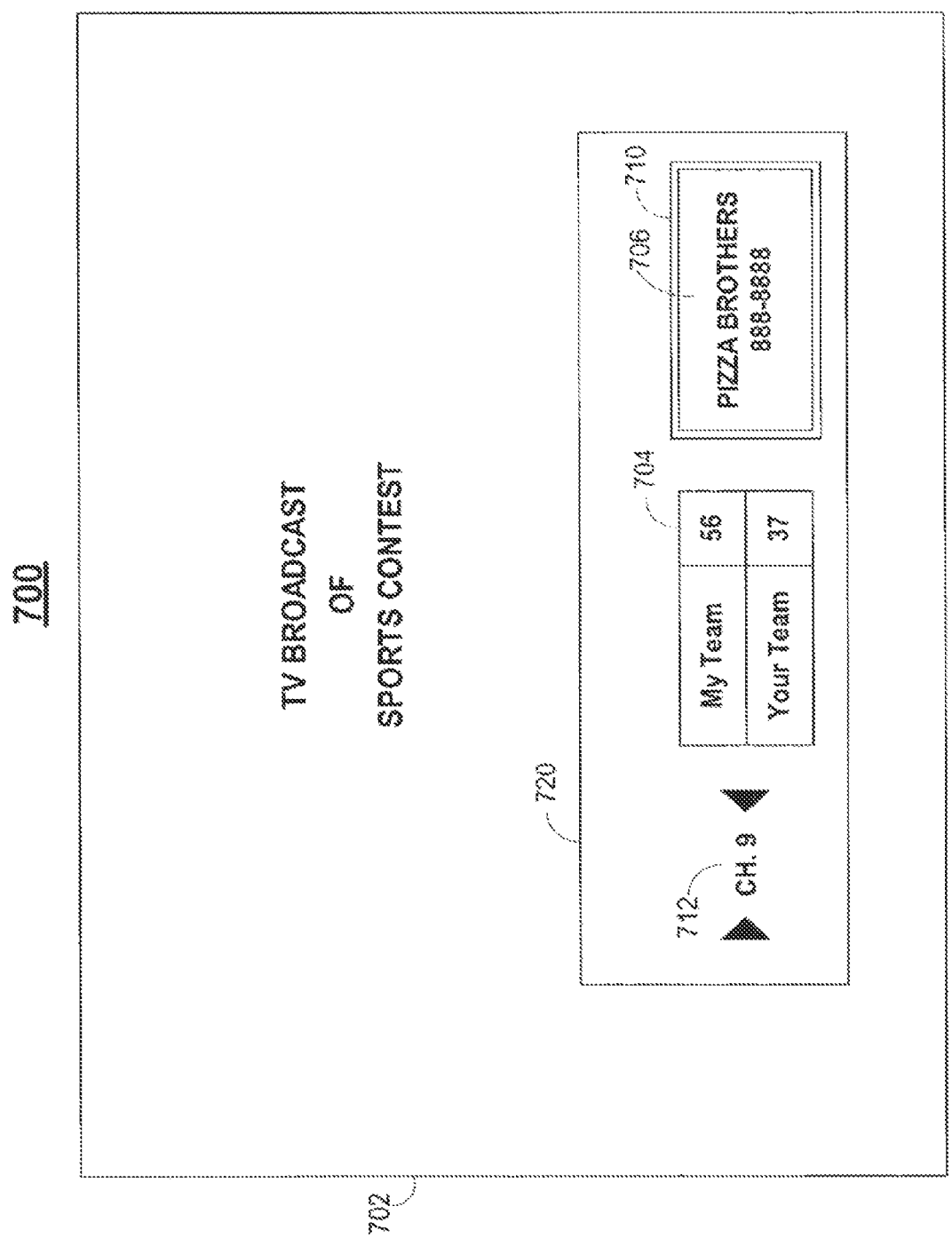
FIG. 7 shows an illustrative fantasy sports contest display screen having a fantasy sports contest information region and multiple advertisement regions in accordance with one embodiment of the present invention.

In one suitable approach, the fantasy sports contest application may provide fantasy sports contest information and advertisements in a flip and browse arrangement. Flip and browse is discussed in Bennington et al. U.S. Pat. No. 6,418,556, which is hereby incorporated by reference herein in its entirety. FIG. 7 shows a display screen 700 with flip and browse type display bar 720 having television channel indicator 712, fantasy sports contest information region 704, and advertisement region 706. Display bar 720 may be overlaid on related television sports broadcast 702. Fantasy sports contest information region 704 may display fantasy sports contest information such as the current scoring totals for a fantasy sports contest involving the user's team. Highlight region 710 may also be provided to enable the user to highlight a particular display region such as advertisement region 706.

Figure 8:
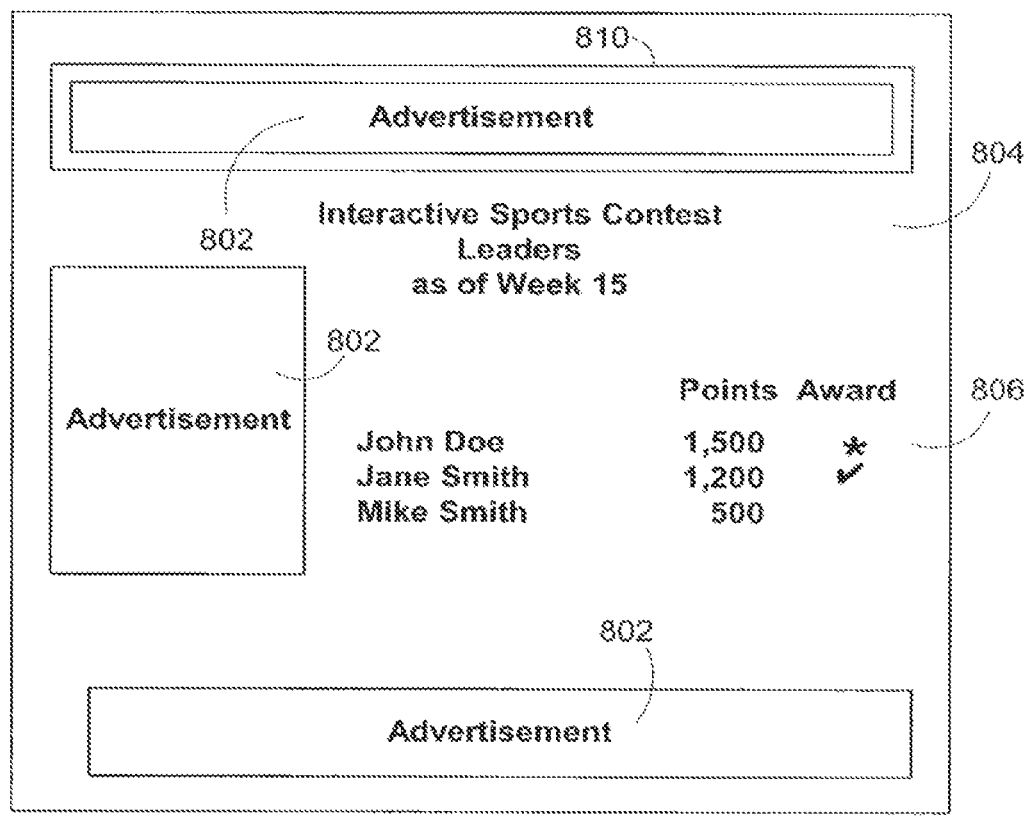
FIG. 8 shows an illustrative display screen having a fantasy sports contest information region and an advertisement region overlaid on a television sports broadcast in accordance with one embodiment of the present invention.

In one suitable arrangement, the fantasy sports contest application need not display fantasy sports contest information and advertisements simultaneously with a television broadcast. FIG. 8 shows an illustrative display screen 800 in which fantasy sports contest information is not displayed in conjunction with a television broadcast. As shown in FIG. 8, fantasy sports contest information region 804 displays information on the individual points leaders in a fantasy sports contest. Multiple advertisement regions 802 are featured on the periphery of display 800. Highlight region 810 may be provided to enable the user to highlight a particular display region such as a particular advertisement region 802.

It will be understood that display screen 800 is merely illustrative. Any other suitable arrangement may be used in a full-screen display of fantasy sports contest information and advertisements. For example, advertisement regions 802 may overlay fantasy sports contest information region 804 or may be arranged with fantasy sports contest information region 804 such that all information may be viewed unobscured.

FIGS. 4-8 are merely illustrative display screens that show various possible arrangements of television broadcasts, fantasy sports contest information regions, and advertisements. These arrangement may be modified in any suitable way. Any other suitable arrangement may be used in place of those illustrated. It will be understood that features of the present invention having to do with a display of information or options to the user may be used based on any of these or other arrangements.

In one embodiment of the present invention, advertisements displayed by the fantasy sports contest application may be used to inform the user of particular prizes being offered for particular achievements in the fantasy sports contest, and to enable the user to collect the awarded prize.

In one example illustrated by FIG. 9, the fantasy sports contest application informs the user of a prize (e.g., 32" TV) being awarded by a sponsor (e.g., Bestboy.com) for a certain achievement (e.g., top scorer) using an advertisement displayed in advertisement region 906. Fantasy sports contest information region 904 may cooperate with the advertisement displayed in advertisement region 906 by displaying fantasy sports contest information that informs the user of the achievement necessary for winning the prize described in the advertisement. In one suitable arrangement, information on prize requirements (e.g., top 10% of scorers) may be provided by advertising database 206 to the fantasy sports contest application, which may request appropriate fantasy sports contest information from sports contest database 204 for display to the user.

In one suitable arrangement, the fantasy sports contest application may use advertisements in conjunction with a real-time fantasy sports contest to inform users of prizes being awarded for instant performance in the real-time fantasy sports contest. In a real-time fantasy sports contest, instant scoring opportunities may be generated based on the real-time events displayed in a television sports broadcast. For example, the fantasy sports contest application may cause the user to be prompted to predict the outcome of a real-time situation occurring in a sports contest being currently broadcast to the user. The user may be awarded points in the fantasy sports contest for a correct prediction, or deducted points for an incorrect prediction.

In accordance with the present invention, advertisements displayed simultaneously with the broadcast of a sport contest (e.g., a sports contest being used by the fantasy sports contest application to generate scoring opportunities) may continuously entice the user by continuously informing the user of prizes being awarded for performance in instant scoring opportunities.

Figure 10:
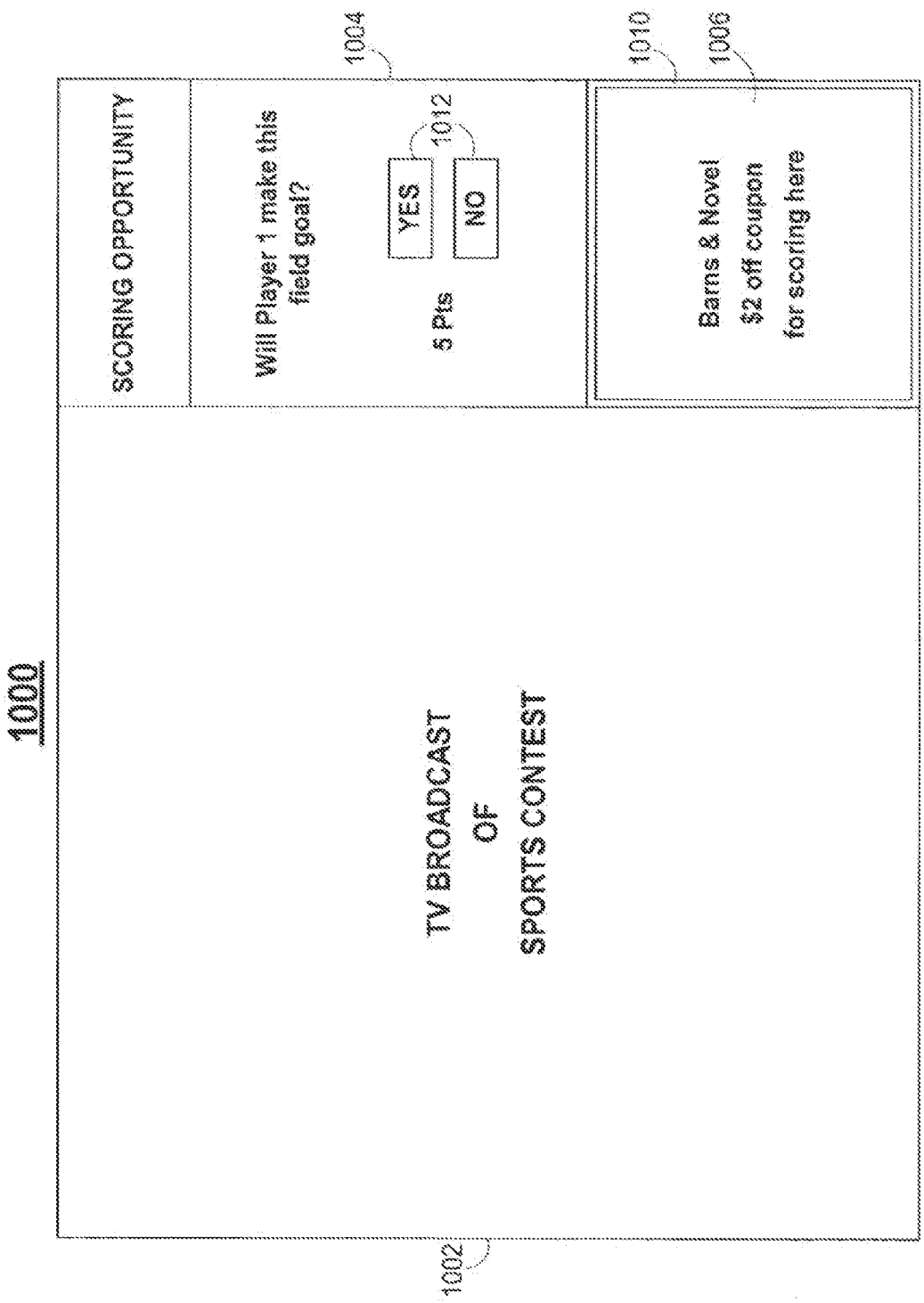
FIG. 10 shows an illustrative display screen having an advertisement informing the user of a prize being awarded for scoring in an instant scoring opportunity of the fantasy sports contest in accordance with one embodiment of the present invention.

In one example illustrated by FIG. 10, display screen 1000 includes television broadcast 1002 of a sports contest, fantasy sports contest information region 1004, and advertisement region 1006. Fantasy sports contest information region 1004 may display information prompting the user to predict the outcome of a real-time situation occurring in broadcast 1002, specifically in the illustrated situation, whether a particular player will convert on a field goal. Fantasy sports contest information region 1004 may also enable the user to make the user's prediction of the real-time situation by selecting one of elements 1012. Advertisement region 1006 may cooperate with the fantasy sports contest by displaying an advertisement that informs the user of an instant prize being awarded for scoring in the instant scoring opportunity displayed in fantasy sports contest information region 1004.

In one suitable arrangement, advertisements that award instant prizes may be stored in advertising database 206 and may be selected by the fantasy sports contest application for display to the user using a point value system. For example, each scoring opportunity and each advertisement offering a prize may be assigned a point value by difficulty of the opportunity and value of the prize, respectively. Scoring opportunities may be matched with advertisements assigned similar point values. Alternately, advertisements offering instant prizes may be selected using other suitable criteria. Using advertisements in the fantasy sports'contest application to inform the user of an instant reward for performing in the fantasy sports contest may attract more attention to the advertisement, the fantasy sports contest, and the related television broadcast.

The advertisements displayed in advertisement regions may be interactive and may lead the user to information screens having further information on an item, an interactive order form, or an advertiser's Internet web site. The user may select a particular advertisement for interaction by highlighting and selecting the advertisement region in which the advertisement is being displayed. For example, when the user selects an interactive advertisement (e.g., by selecting advertisement region 506 of FIG. 5 using highlight region 510 and remote control 222) for Pizza Brothers, information screen 1100 of FIG. 11 may be displayed including menu items available from Pizza Brothers. Display screen 1100 may include video button 1108 that provides access to a multimedia product presentation featuring a Pizza Brothers video advertisement. An interactive advertisement may also enable the user to purchase an item being advertised.

Figure 12:
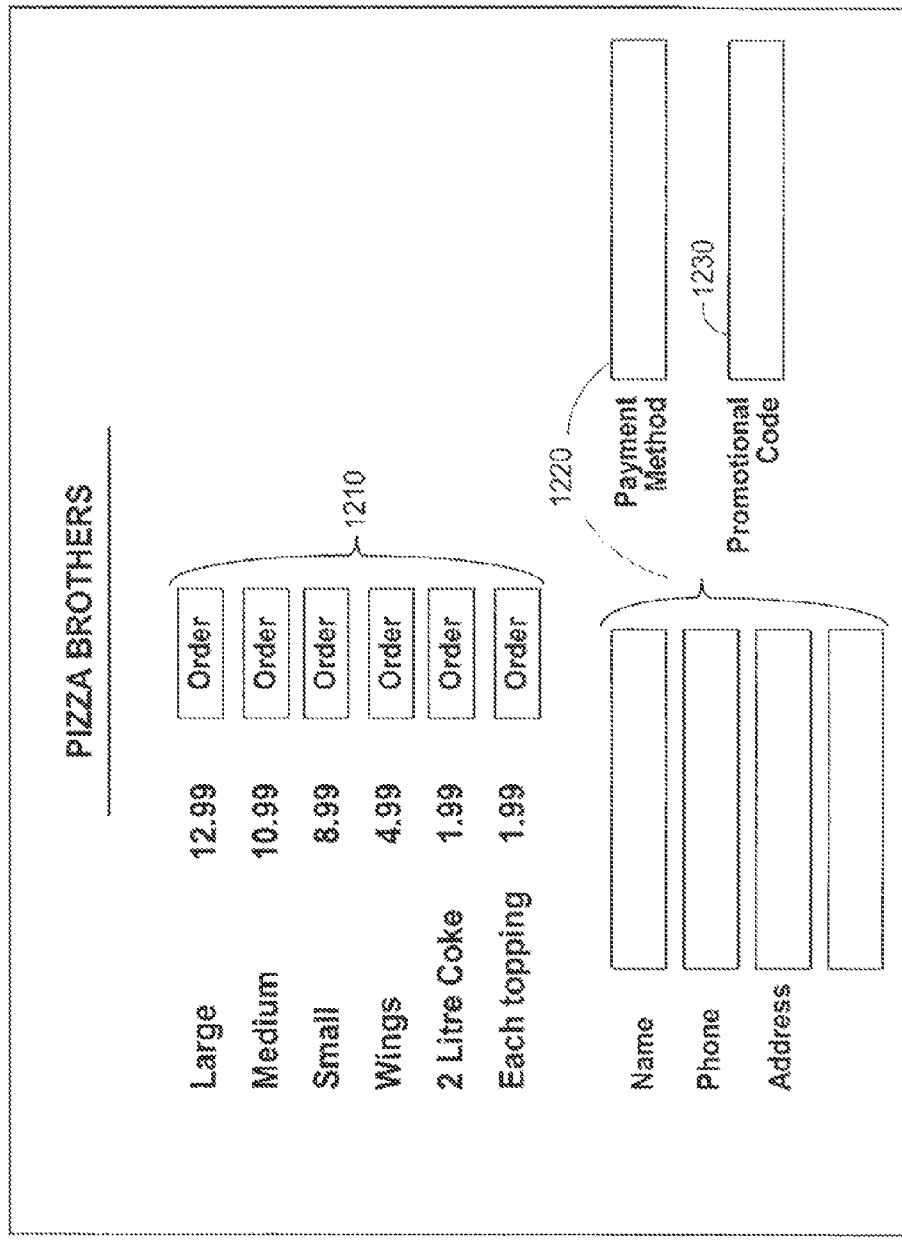
FIG. 12 shows an illustrative interactive order form in accordance with one embodiment of the present invention.

As illustrated in FIG. 12, user selection of an interactive Pizza Brothers advertisement (e.g., by selecting advertisement region 506 of FIG. 5) may lead to order form 1200 having order buttons 1210 next to each menu item, and information boxes 1220 for entering the user's purchasing information. Alternately, user selection of an interactive advertisement may lead the user to the sponsor's website, which may be capable of processing product orders.

Figure 13:
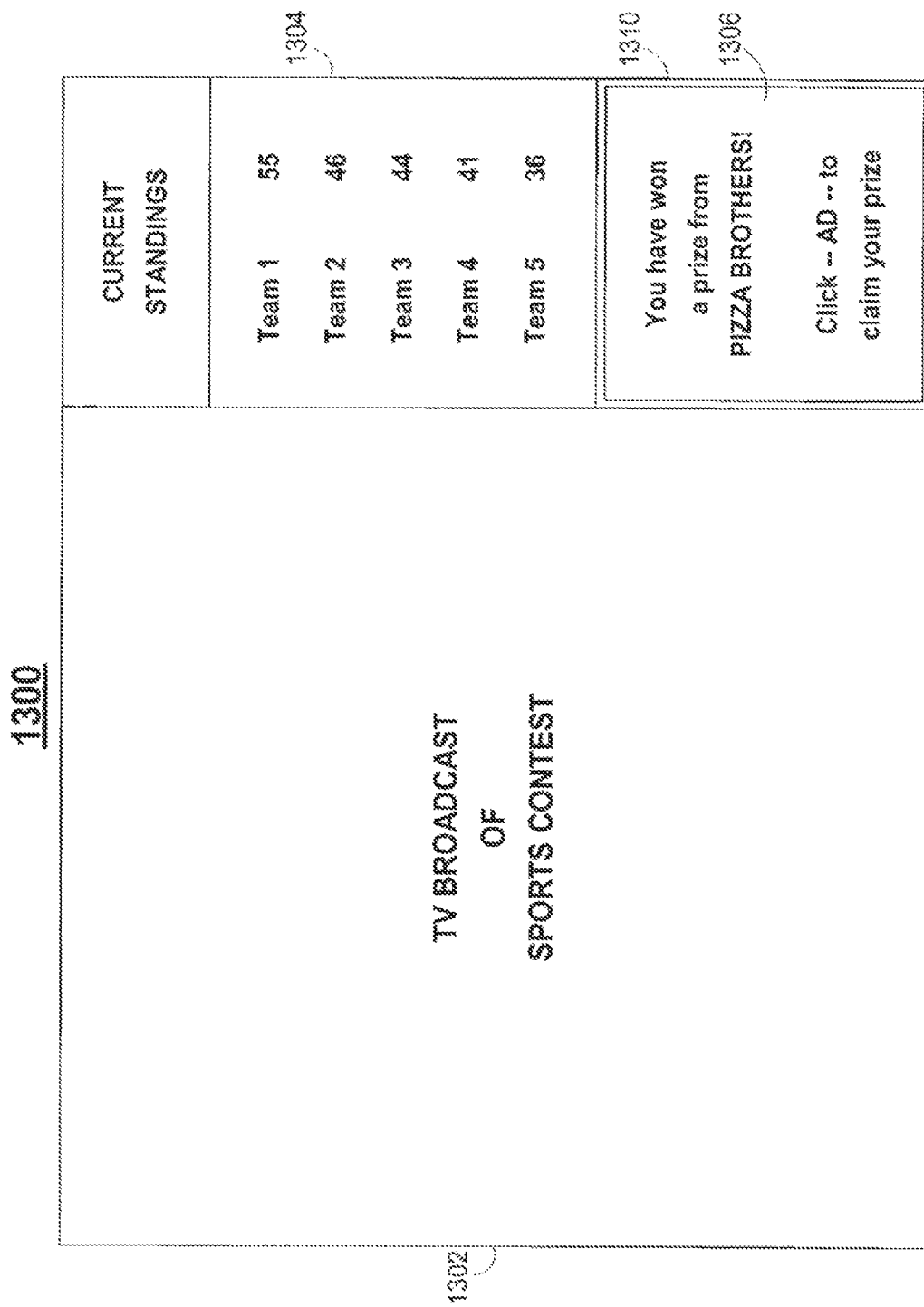
FIG. 13 shows an illustrative display screen having an advertisement notifying the user of the prize the user has won in accordance with one embodiment of the present invention.

In one suitable approach, interactive advertisements may be used to inform the user when the user has won a prize in the fantasy sports contest. The interactive advertisement may also enable the user to instantly collect the awarded prize. As illustrated in FIG. 13, when the user wins a prize in the fantasy sports contest, the fantasy sports contest application may display a prize advertisement in advertisement region 1306 informing the user of the nature of the prize won and the advertiser awarding that prize. User selection of the prize advertisement may cause the fantasy sports contest application to display an interactive order form similar to that shown in FIG. 12, in which the appropriate order and payment have been prearranged. The user may only be required to enter vital information to collect the prize. For example, the fantasy sports contest application may query sports contest database 204 for a list of users qualifying for the prize. The list of qualifying users may be used to generate, in cooperation with advertisements pulled from advertising database 206, prize advertisements to be displayed to the qualifying users. Information identifying the prize and the user may be transmitted to set-top box 218 for display. The identifying information may then be used to fill in an interactive order form stored in advertising database 206 and transmitted to set-top box 218. Alternately, the fantasy sports system may also transmit to set-top box 218 vital information previously provided by the user, so that the user may only be required to confirm vital information. Alternately, order form 1200 may be substituted with a sponsor's web site featuring product ordering capabilities.

In another suitable approach, user selection of the prize advertisement may lead to information screen 1400 of FIG. 14, which may assign the user unique prize PIN or prize password 1450 to be used when claiming the prize. Screen 1400 may include link 1460 to order form 1200 (FIG. 12), and prize PIN or prize password 1450 may be used in Promotional Code box 1230 of order form 1200 to simplify the prize claiming process by identifying both the user and the prize. In one suitable arrangement, a package of information sent to user equipment 214 for the purpose of notifying the user of winning a prize may include a PIN or password. A copy of this information package may be sent to an advertiser's database separate from databases 204, 206, 212, and 224. When the user enters the PIN or password, the PIN or password may be transmitted to the advertiser's database, and may be used to identify the user and match the user with the prize.

In another suitable approach, illustrated by FIG. 8, the fantasy sports application notifies the user of a prize award by display icons 806 in display screen 800. To find out the prize, the fantasy sports application may allow the user to select the icon or press a button on an input device that matches the display icon 806 (e.g., a remote control that has "*" button). Selection of icon 806 may lead to information screen 1400 (FIG. 14) or order form 1200 (FIG. 12) that enables the user to claim the prize. Similarly, icons 806 may be used in a fantasy sports contest information region (e.g., region 504 of FIG. 5) to indicate that the user has won a prize in the contest. Alternately, an audio alert may accompany any of the visual methods of prize notification described above.

Figure 15:
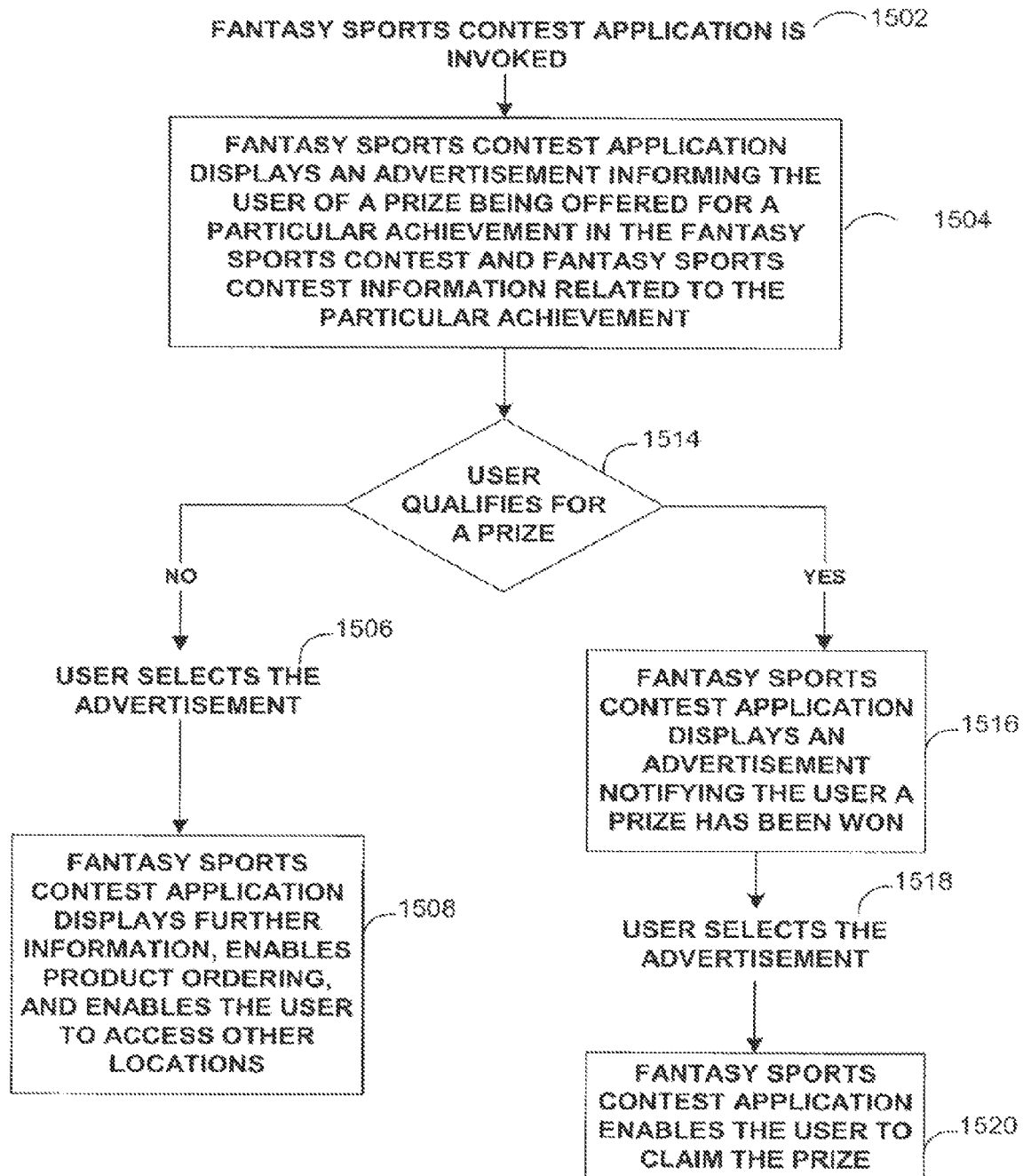
FIG. 15 is a flow chart of illustrative steps involved in using advertisements to inform the user of a prize being offered and to enable the user to collect an awarded prize in accordance with one embodiment of the present invention.

FIG. 15 is a flow chart of illustrative steps involved in using advertisements to inform the user of a prize being offered and to enable the user to collect an awarded prize. Functionality of interactive advertisements is also illustrated in FIG. 15. At step 1502 the fantasy sports contest application is invoked. For example, the user may press a button on remote control 222 to invoke the fantasy sports contest application, or the fantasy sports contest application may be invoked automatically when the user tunes to a television broadcast related to fantasy sports contests.

At step 1504 (which may occur either substantially immediately after step 1502 or after one or more other steps), the fantasy sports contest application may display to the user an interactive advertisement informing the user of a prize being offered in the fantasy sports contest. The advertisement is displayed to the user along with a fantasy sports contest information region displaying corresponding fantasy sports contest information related to the achievement required to win the prize. For example, the fantasy sports contest application may display advertisements of prizes based on a preset schedule, and the appropriate advertisements may be transmitted to set-top box 218 and stored for display according to the schedule or according to any other suitable technique for acquiring advertisement as discussed previously with regard to FIGS. 1-3. Corresponding fantasy sports contest information on the achievement required to win the prize may be transmitted on demand from server 212 to set-top box 218 as the fantasy sports contest develops or using any other suitable technique.

At step 1514, if the user qualifies for or wins a prize in the fantasy sports contest the fantasy sports contest application displays an advertisement notifying the user that a prize has been won at step 1516. User selection of the advertisement at step 1518 results in the fantasy sports contest application enabling the user to claim the prize at step 1520. For example, the fantasy sports contest application may display to the user an interactive order form such as that of FIG. 12, or may allow the user to access another location such as an advertiser's Internet website. Alternately, the fantasy sports contest application may enable the user to access those locations through an intermediary screen such as that of FIG. 14 assigning the user a prize PIN or prize password.

Figure 11:
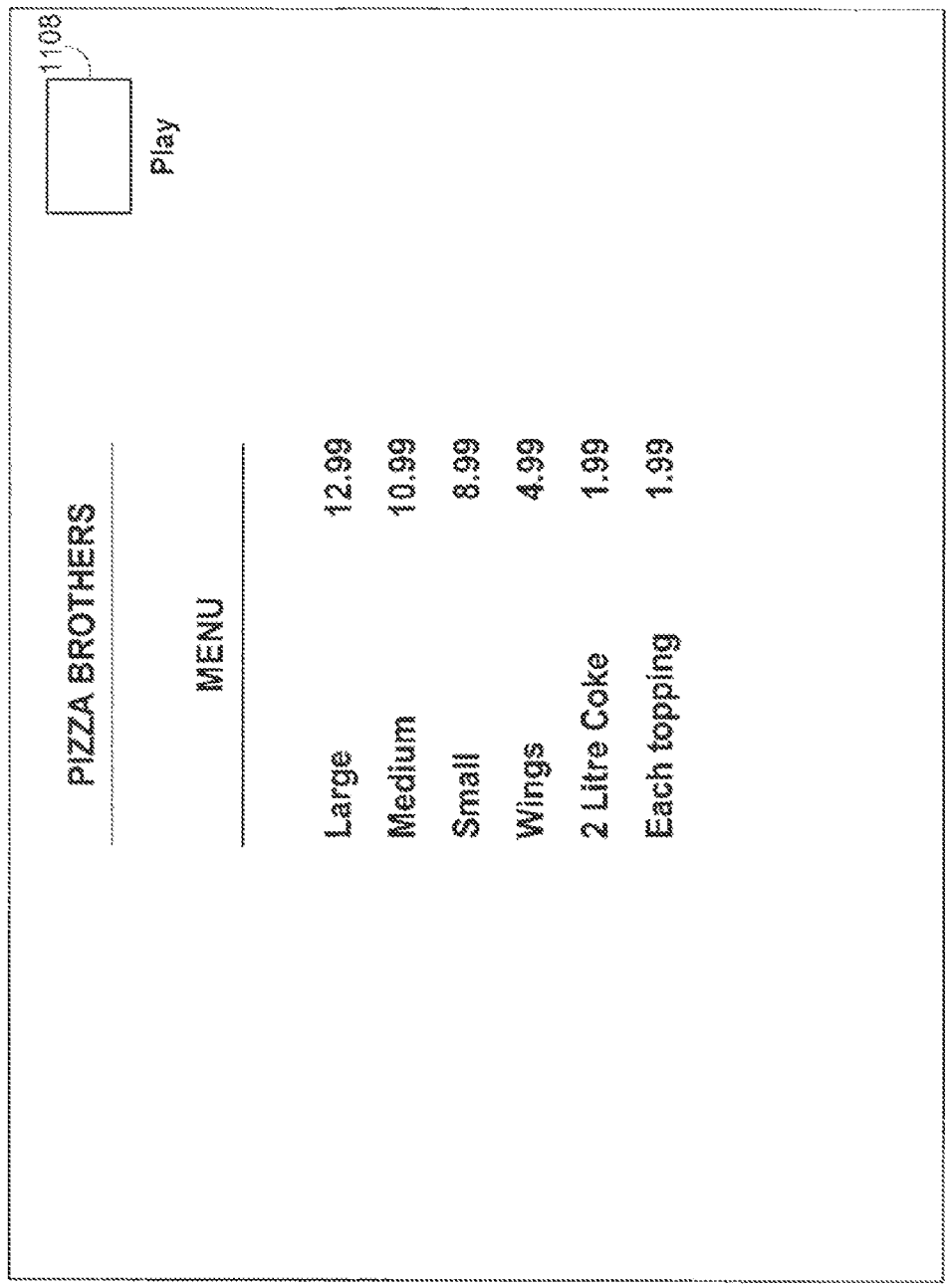
FIG. 11 shows an illustrative display screen that may be accessed by user selection of an interactive advertisement in accordance with one embodiment of the present invention.

If the user does not qualify for or win a prize at step 1514, user selection of the interactive advertisement at step 1506 may cause the fantasy sports contest application to display to the user a further information screen such as that of FIG. 11, enable the user to access an order form for purchasing the advertised item such as that of FIG. 12, or may enable the user to access another location (e.g., a sponsor's Internet website) at step 1508. For example, an information screen such as the one illustrated in FIG. 11 may be displayed to the user upon user selection of an interactive advertisement. This information screen may provide the user with links to an order screen or to another destination, and may be transmitted using methods substantially equivalent to the methods used to transmit advertisements.

In one embodiment of the present invention, the fantasy sports contest application may schedule particular advertisements to be displayed during or around particular events of a television broadcast related to the fantasy sports contest. For example, a television broadcast of a sports contest that has an impact on the outcome of the fantasy sports contest. Advertisements may be selectively scheduled, taking into consideration the nature of the advertisement and the item being promoted, to better take advantage of user purchasing habits associated with certain events in a television broadcast of a sports contest. Particular advertisements may be selectively scheduled for display at a particular time or particular times in relation to the status of the sports contest being broadcast (e.g., right before the contest, at half-time, or some time after a contest).

Figure 16:
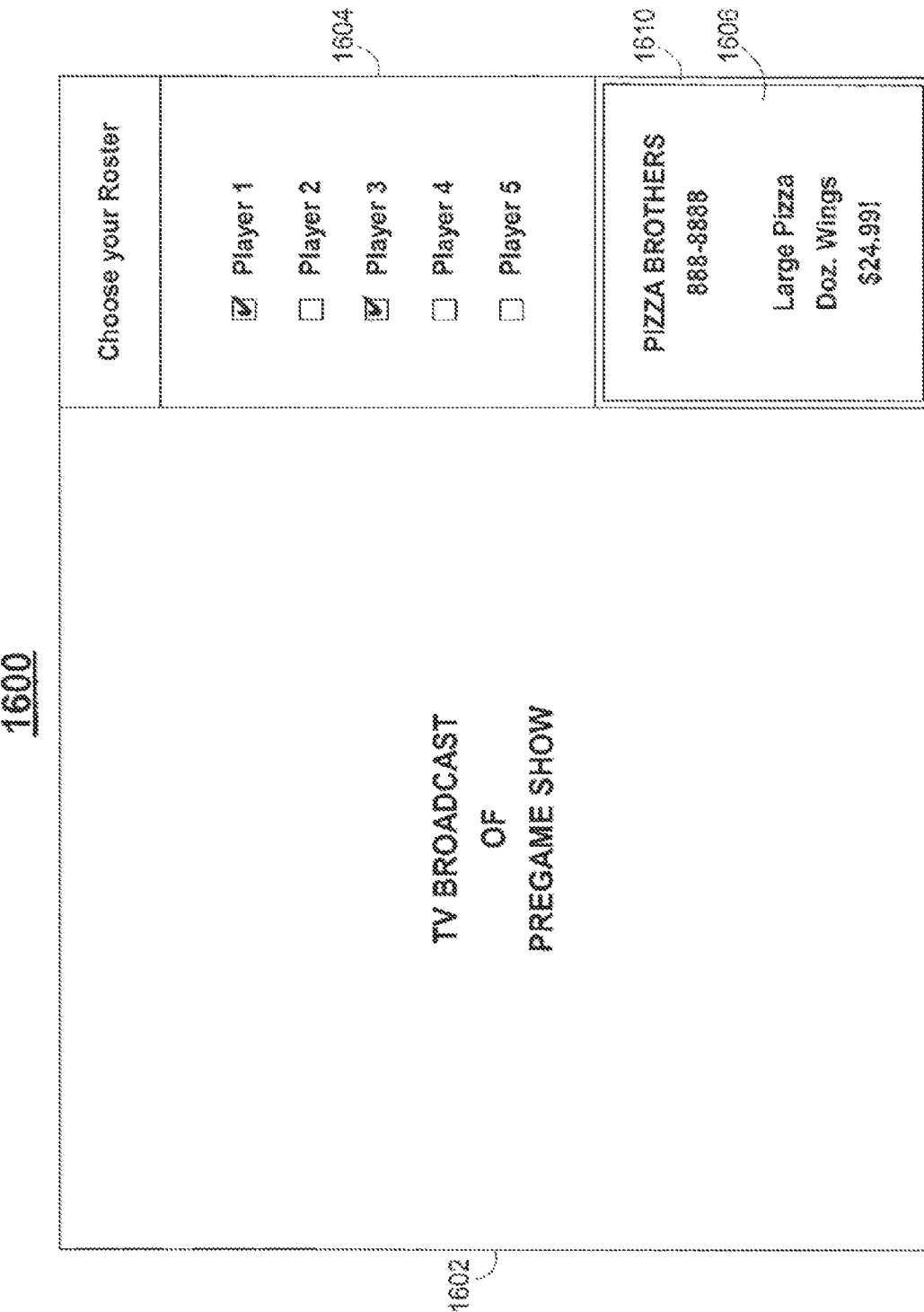
FIG. 16 shows an illustrative display screen having an advertisement scheduled to be displayed at a time in the television sports broadcast before the start of the sports contest in accordance with one embodiment of the present invention.

For example, ordering food and beverages for consumption in connection with watching a television sports broadcast is a common occurrence. As illustrated by FIG. 16, this particular user purchasing habit may be better served by displaying advertisements for food delivery at the beginning of a sports broadcast (e.g., during the pre-game show), which may result in an increase in the number of users who will respond to the advertised offer. FIG. 16 shows display screen 1600 having fantasy sports contest information region 1604, advertisement region 1606, and television broadcast 1602 of a pre-game show (e.g., a preview segment generally broadcast before the start of a sports contest). Fantasy sports contest information region 1604 may display information and selectable elements that enable the user to perform actions in the fantasy sports contest before the real-life contest begins. For example, the user may use the time before the start of the real-life contest to decide which real-life players to include on the user's fantasy sports team roster. During the pre-game show, as illustrated in FIG. 16, the fantasy sports contest application has selected for display in advertisement region 1606 an advertisement promoting an item that takes advantage of the user's pre-game purchasing habit (e.g., ordering pizza before the start of a sports broadcast).

Figure 17:
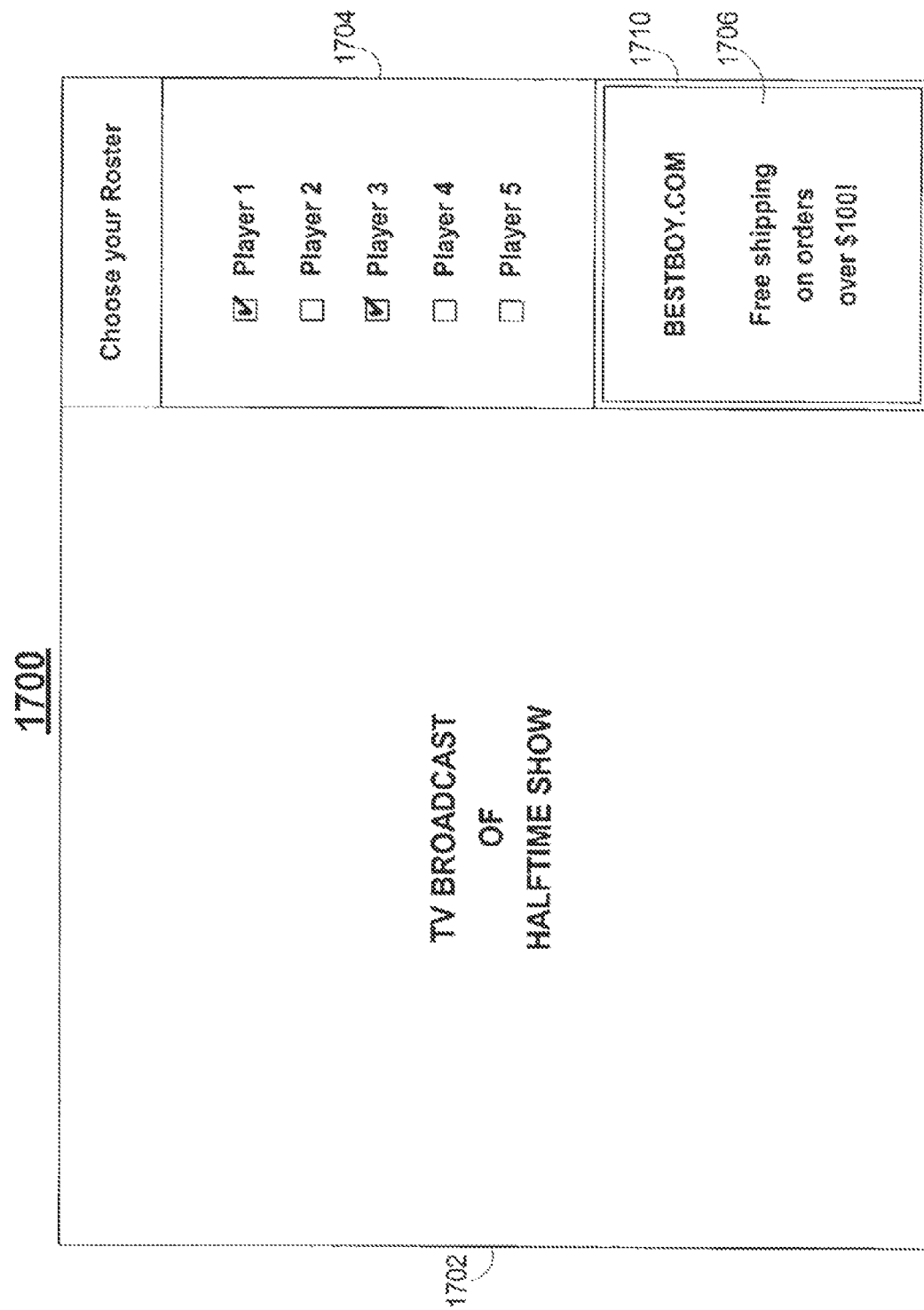
FIG. 17 shows an illustrative display screen having an advertisement scheduled to be displayed at a time in the television sports broadcast during an intermission of the sports contest in accordance with one embodiment of the present invention.

In another suitable approach illustrated by FIG. 17, the fantasy sports contest application displays in advertisement region 1706 an interactive advertisement that entices the user to explore a web site during the intermission period of a sports contest (e.g., during the half-time show). By scheduling an advertisement that requires a large time investment for the intermission period, the sponsor may be able to attract more interest in the advertisement than if the advertisement had been scheduled during the body of the sports broadcast.

Figure 18:
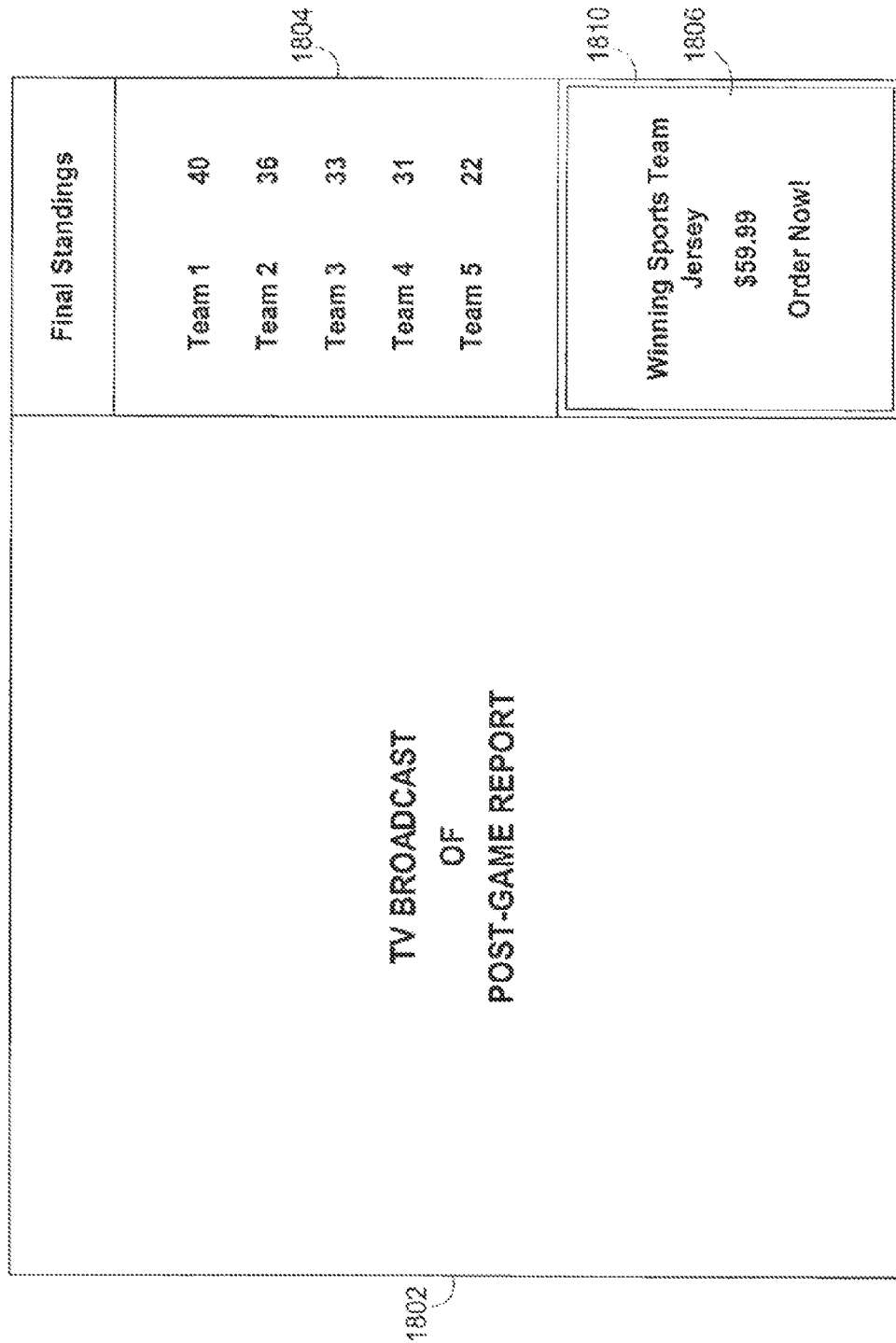
FIG. 18 shows an illustrative display screen having an advertisement scheduled to be displayed at a time in the television sports broadcast after the end of the sports contest accordance with one embodiment of the present invention.

In another suitable approach illustrated by FIG. 18, advertisement region 1806 may display an advertisement based on the outcome of the sports contest being broadcast. For example, the fantasy sports contest application may display in region 1806 an advertisement for the winning sports team's merchandise immediately after the end of the sports contest to take advantage of fan enthusiasm following a sports team's victory. All of the foregoing examples illustrate how advertisements may be intelligently scheduled for display at certain times of a television broadcast of a sports contest related to the fantasy sports contest to take advantage of user purchasing habits. User purchasing habits may be determined using a history of past purchases the user has made using the fantasy sports contest application, and the time relative to a sports contest broadcast the purchases were made. Alternately, user purchasing habits may be determined using data on one more than one user. Data which may be collected from user interactions with the fantasy sports contest application, with other interactive applications (which may not be implemented using the same system as the fantasy sports contest application), purchased or otherwise obtained from a third party, or obtained using any other suitable sources or methods.

In one suitable arrangement, advertisements may be transmitted from a television distribution facility 208 to set-top box 218 according to a preset schedule, transmitted from television distribution facility 208 as an entire package and displayed by set-top box 218 using a preset schedule, or may be transmitted from television distribution facility 208 when requested by set-top box 218. Set-top box 218 may be programmed to take certain actions based on the occurrence of certain events in the television sports broadcast or programmed to take actions according to a preset schedule. For example, the vertical blanking interval ("VBI") of the television broadcast signal may provide the fantasy sports contest application with information about the event status of the current sports contest (e.g., before the game, during the game, in commercial, after the game, etc.). In one suitable arrangement, advertisements may be categorized for each event status in advertising database 206. For example, advertisements requiring a large time commitment may be categorized as appropriate for intermissions in the sports contest, and advertisements that promote food delivery may be categorized as appropriate for before the start of the sports contest. Television distribution facility 208 or set-top box 218 may process the event status information included in the broadcast signal and accordingly transmit or request, respectively, the advertisements categorized as appropriate for each predefined event status.

Figure 19:
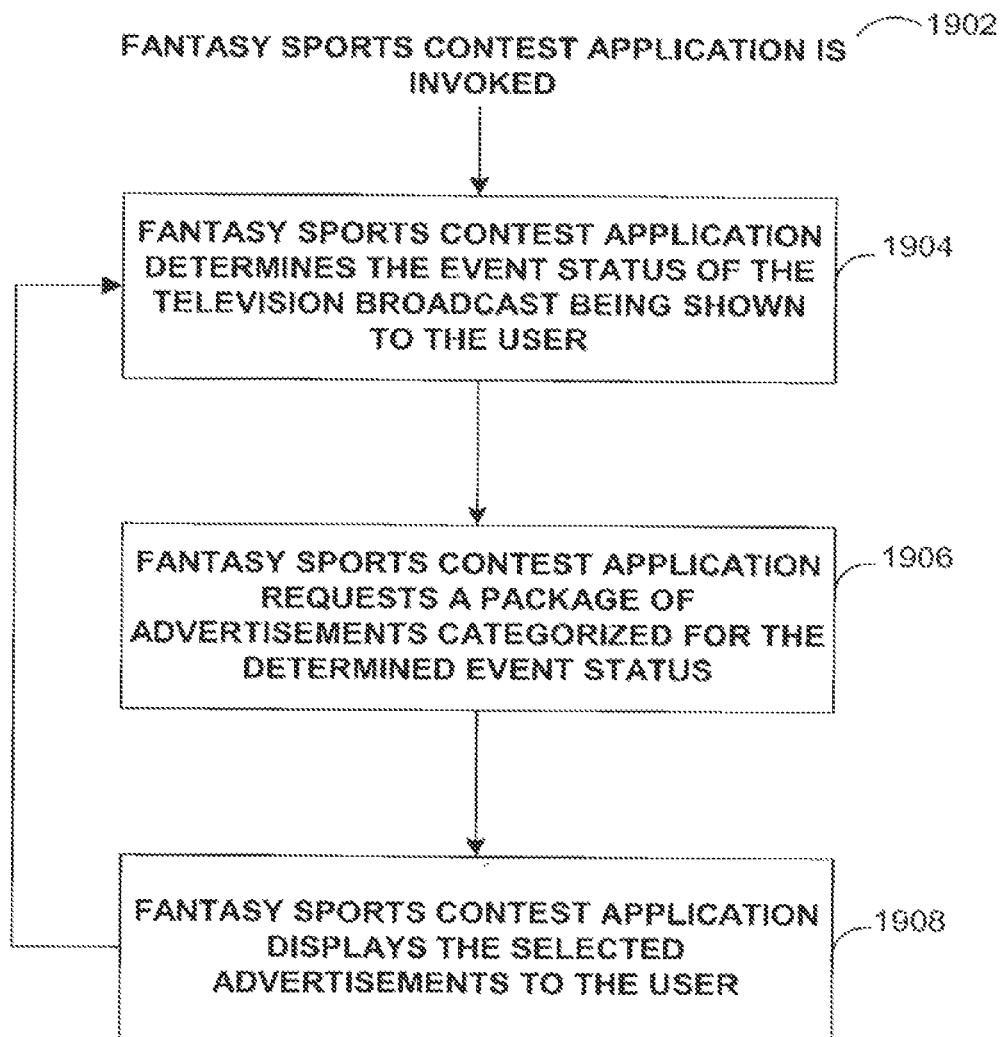
FIG. 19 is a flow chart of illustrative steps involved in selecting advertisements for display according to the event status of a television sports broadcast provided in conjunction with the fantasy sports contest in accordance with one embodiment of the present invention.

FIG. 19 shows a flow chart of illustrative steps involved in one suitable way in determining when to display particular advertisements using the fantasy sports contest application. At step 1902 the fantasy sports contest application is invoked. The fantasy sports contest application determines the event status of the television broadcast being displayed to the user at step 1904. For example, set-top box 218 reads event status information included in the vertical blanking interval of the television broadcast signal being transmitted from television distribution facility 208.

At step 1906, the fantasy sports contest application requests advertisements categorized as appropriate for the particular event status. For example, set-top box 218 may request that a package of advertisements deemed appropriate for the determined event status be transmitted from server 212. The fantasy sports contest application then displays the appropriate advertisements to the user at step 1908. In an iterative process, the fantasy sports contest application continuously determines event status for the purpose of displaying the appropriate advertisements for the appropriate event status.

In one embodiment of the present invention, the fantasy sports contest application may target advertisements toward a particular user or group of users using user profiles. A user profile may include any suitable information that may help determine the user's preferences and may include information on the user's demographics data, the user's interaction history with the fantasy sports contest application and other interactive applications, the contents of the user's fantasy sports contest team roster, the frequency with which the user views highlight reels of certain players or teams, the user's history of past purchases, the television viewing habits of the user, the user's history of Internet web browsing, psychographic information, and any other suitable user information.

For example, the user profile may include information on the user's fantasy sports contest team roster. Such information may show that the user has a tendency to choose players from one real-life team more often than any others for the user's fantasy sports contest team roster. The fantasy sports contest application may use this information from the user profile to target particular advertisements for display to that particular user promoting that particular real-life team's merchandise, or that particular real-life team's televised contests.

The user profile may include information accumulated from monitoring the user's interaction with the fantasy sports contest application. For example, information such as the frequency with which the user views a particular player's statistics, or the frequency with which the user views a player's or team's highlights, may be collected in the user profile. Information on merchandise purchased through advertisements in the fantasy sports contest application may also be collected in the user profile.

The user profile may be stored in any suitable location in the system of FIG. 1 or FIG. 2. For example, set-top box 218 may include a processor for monitoring the user's interaction with the fantasy sports contest application, and may send appropriate data on the user for storage in user profile database 224 at main facility 202. Using the user profile information collected from the user's interaction with the fantasy sports contest application, server 212 may request a package of advertisements for transmission to set-top box 218 that takes into account the user's demonstrated preferences. In another suitable arrangement, user profile information may be collected and stored locally (i.e., at the user equipment). In this arrangement, the fantasy sports contest application may be at least partially implemented at the user equipment and may choose stored advertisements to display (or request suitable advertisements from the appropriate remote source).

The user profile may include information collected by the fantasy sports contest on the user's interaction with other interactive applications (e.g., electronic program guide application, Internet applications), whether or not these applications are implemented using the same system as the fantasy sports contest application. For example, the user profile may include a history of user purchases of pay-per-view sports programs. Similarly, a history of products and services purchased through an interactive application (e.g., e-commerce transactions via a Web browser) may be included in the user profile.

Certain advertisements may also be selected for one or more users based on information in the user profile on the user's past television viewing habits. For example, the user that tends to watch proportionally more basketball games than golf contests may be targeted to see a relatively greater number of promotions for real-life and fantasy sports contest basketball than the average user, who might see a proportionally greater number of advertisements for golf theme promotions. More detailed information, such as frequency with which the user watches games featuring certain teams may also be collected for the user profile. For example, television programs may be categorized into suitable groups. Data on the television program being viewed by the user may be continuously transmitted by the set-top box 218 to server 212 and stored in the user profile on database 224. This data may be sorted to produce information on the user's television viewing preferences, which may be used by the fantasy sports contest application to select advertisements for display to the user.

Information on the user's Internet web browsing habits (e.g., browsing favorites, or browsing history), voluntary survey responses, and any other suitable information on the user may be included in the user profile and used to select advertisements for display to the user.

The source of information included in the user profile and used to target advertisements to users is not limited to what is described here. Information included in the user profile may be purchased, or otherwise obtained, from third party vendors who collect information about individuals in marketing databases.

Figure 20:
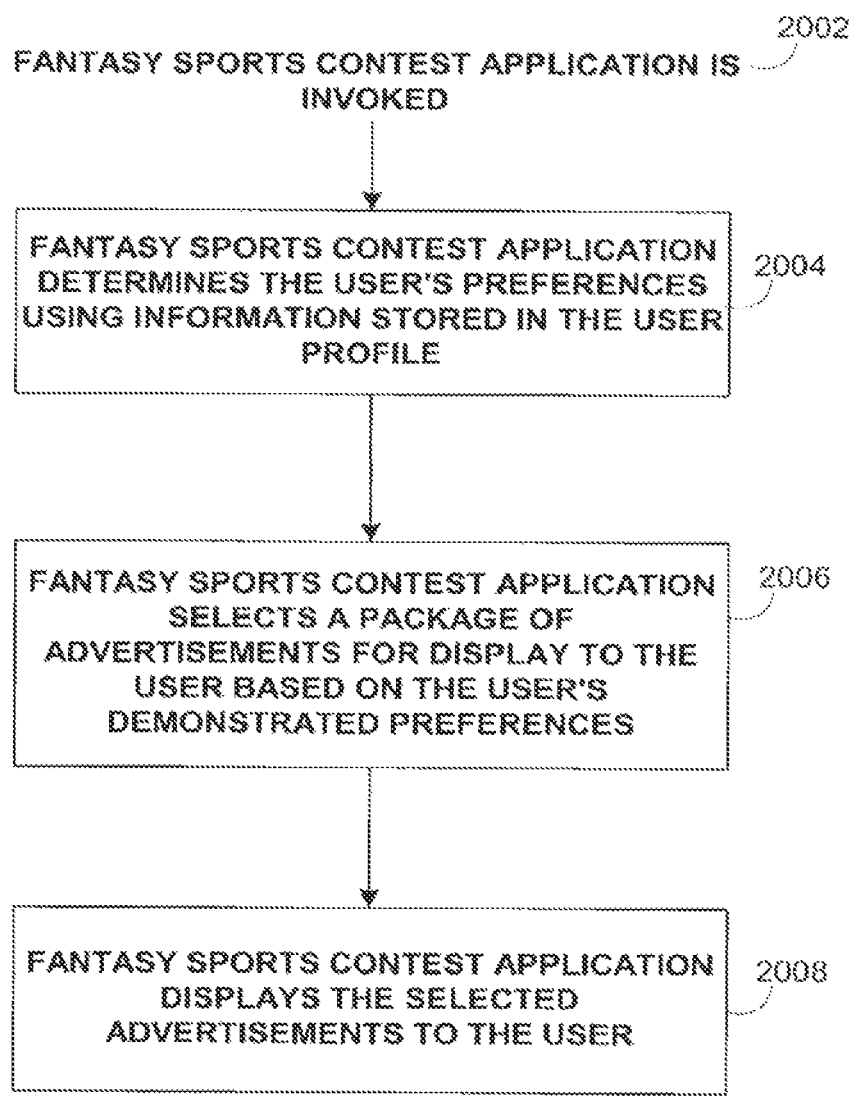
FIG. 20 is a flow chart of illustrative steps involved in targeting advertisements for display using information from a user profile in accordance with one embodiment of the present invention.

FIG. 20 is a flow chart of illustrative steps involved in using a user profile in selecting advertisement to display using the fantasy sports contest application. At step 2002 the fantasy sports contest application is invoked. The fantasy sports contest application determines the user's demonstrated preferences using information stored in the user profile at step 2004. For example, the fantasy sports contest application may search the user profile stored in database 224 for information on the user's fantasy sports contest team roster, information collected from monitoring the user's interaction with the fantasy sports contest application (e.g., frequency the user views highlights of a particular player or team), information collected from monitoring the user's interaction with other interactive applications (regardless of whether these other applications are implemented by the same system), information collected from monitoring the user's television viewing habits, information from collected from the user's Internet browsing history, information collected from the user's history of product purchases, information on the user purchased or otherwise obtained from an outside vendor, or any other suitable information that lends insight on the user's preferences.

At step 2006, the fantasy sports contest application selects advertisements matching the user's preferences for display to the user. The fantasy sports contest application then transmits the selected advertisements to the user equipment (e.g., set-top box 218) for display to the user at step 2008.

In one embodiment, the fantasy sports contest application may display to the user local advertisements specifically targeted for the user's geographic location. In one suitable approach, in an interactive television implementation, the fantasy sports contest application may detect the network node (e.g., a local cable system headend) from which the user accesses the fantasy sports contest application. The fantasy sports contest application may use this network node information to identify the user's geographic location and to select a package of geographically targeted advertisements from advertising database 206 for transmission to set-top box 218. The package of local advertisements may be stored at set-top box 218 and updated from database 206 as needed. Alternatively, set-top box 218 may request local advertisements from advertising database 206 as needed for display to the user.

Alternatively, the local advertisements may be streamed to the user in real-time or in quasi-real time feeds.

In another suitable approach involving distributed network nodes, server 300 at network node 302 may include a bin of local advertisements. Network node 302 at a particular geographic location may be part of a local cable system, which may provide the bin of local advertisements from local advertisers. In one suitable arrangement, set-top box 218 may request local advertisements from server 300 as needed for display to the user. In another suitable arrangement, set-top box 218 may download the entire bin of local advertisements from server 300 for storage at the user's location. In another suitable arrangement, the local advertisements may be automatically fed for display to the user and may replace advertisements that are indicated to be preemptable by local advertisements. Server 300 may update the bin of local advertisements stored on set-top box 218 by negotiating additional download operations using any suitable method. In another suitable arrangement, server 300 may insert local advertisements into a continuous stream of advertisements being transmitted from television distribution facility 208 to set-top box 218 using, for example, one or more digital television channels.

In one suitable approach, the headend apparatus may be programmed to make use of information already collected by the fantasy sports contest application of the present invention. The headend could then use information to personalize the local advertisements displayed to the user.

In another suitable approach, information on the user's geographic location may be included in the user profile on user profile database 224. The fantasy sports contest application may use geographic location information included in the user profile to select an appropriate package of local advertisements for display to the user. The fantasy sports contest application may directly transmit the local advertisements to set-top box 218 for display to the user, may transmit the local advertisements to set-top box 218 for local storage and display, or may transmit the local advertisements to server 300 for distribution to set-top box 218.

In one suitable arrangement, the fantasy sports contest application may display local advertisements to the user according to a preset schedule for displaying advertisements. The preset schedule for displaying advertisements may include scheduled slots set aside for the display of local advertisements. When the schedule calls for a local advertisement to be displayed to the user, the fantasy sports contest application may load a local advertisement for display to the user that is stored at user equipment 214, at server 212/300, at database 206, or any other suitable location. Alternately, the fantasy sports contest application may load a local advertisement for display to the user that is being transmitted to the user using a continuous stream of advertisements on one or more dedicated television channels, or any other suitable method of transmission.

Figure 21:
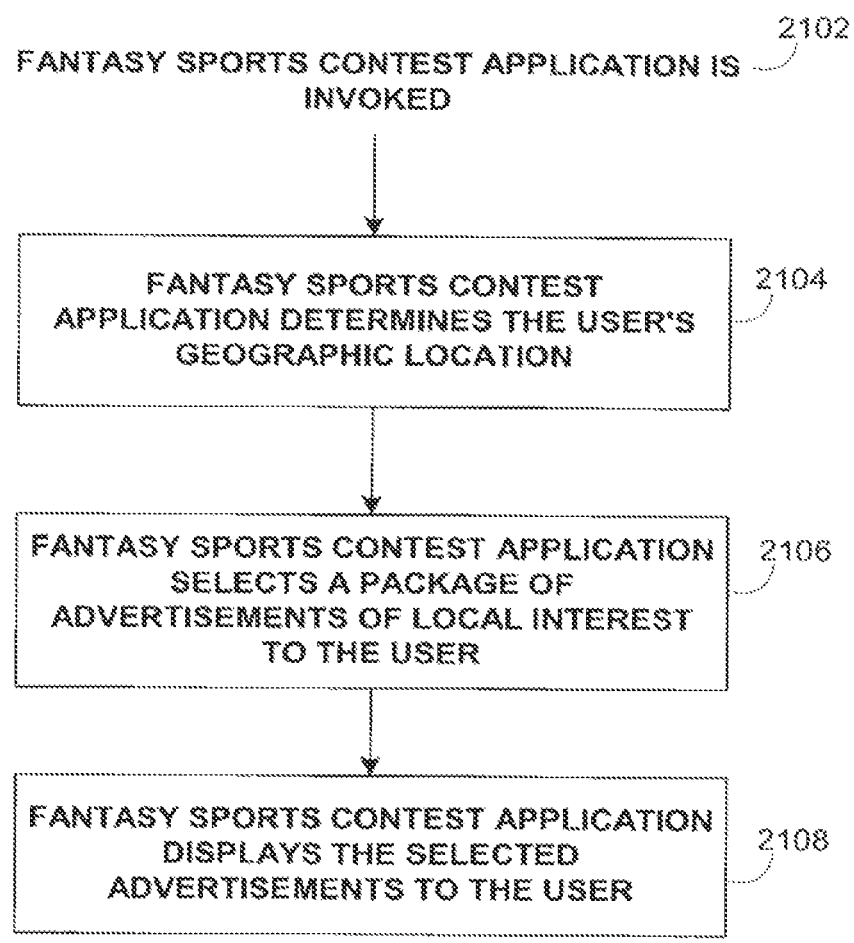
FIG. 21 is a flow chart of illustrative steps for displaying to the user local advertisements of specific interest to the user's geographic location in accordance with one embodiment of the present invention.

FIG. 21 is a flow chart of illustrative steps involved in providing the user with local advertisements of specific interest to the user's geographic location. At step 2102 the fantasy sports contest application is invoked. At step 2104 the fantasy sports contest application determines the user's geographic location. The fantasy sports contest application can be provided geographic information by a network node (e.g., a local cable system headend) used by the user to access the fantasy sports contest application. Using the geographic information, at step 2106 the fantasy sports contest application can choose a package of advertisements of local interest to the user's geographic location for transmission to the user equipment (e.g., set-top box 218) for display at step 2108.

If desired, the fantasy sports contest application may be implemented as an on-line application hosted by a server connected to the Internet. The on-line fantasy sports contest may be displayed using a web browser on a personal computer, a web-enabled set-top box, a Web TV box, a personal computer television (PC/TV), a PC tablet, a personal organizer, or other suitable user equipment with suitable Internet access capabilities. With such an arrangement, fantasy sports contest application data and advertisement data may be stored remotely on a server that the user of the on-line fantasy sports contest may access through an Internet connection and may download the data locally. In the implementation of such a system, server 100 of FIG. 1 may be replaced by the host server of an Internet website and user equipment 110 can be replaced by a personal computer or other suitable end-use computing device.

Thus, systems and methods for fantasy sports contest applications with enhanced advertising capabilities are provided. One skilled in the art will appreciate that the present invention can be practiced by other than the described embodiments, which are presented for purposes of illustration and not of limitation, and the present invention is limited only by the claims which follow.

What is claimed is:

1. A method for providing advertisements on a display screen to a user using a fantasy sports contest application, the method comprising:

generating for display on the display screen fantasy sports contest information for an instant scoring opportunity that prompts the user to predict the outcome of an event displayed in a television broadcast related to a fantasy sports contest;

identifying an advertisement that offers a prize that matches a level of difficulty of the instant scoring opportunity; and generating for display on the display screen, simultaneously with the fantasy sports contest information, the identified advertisement.

2. The method of claim 1 wherein generating the identified advertisement for display comprises generating for display an interactive advertisement.

3. The method of claim 1 wherein generating fantasy sports contest information for display comprises generating for display fantasy sports contest information related to a requirement for winning the prize in the instant scoring opportunity.

4. The method of claim 1 further comprising generating for display on the display screen, simultaneously with the fantasy sports contest information and the identified advertisement, the television broadcast related to the fantasy sports contest.

5. The method of claim 1 further comprising enabling the user to claim the prize through the identified advertisement.

6. The method of claim 5 further comprising transmitting at least one of a PIN or password to the user for claiming the prize.

7. A non-transitory computer readable medium encoded with machine-readable instructions for providing advertisements on a display screen to a user of a fantasy sports contest application, the machine-readable instructions comprising:

generating for display on the display screen fantasy sports contest information for an instant scoring opportunity that prompts the user to predict the outcome of an event displayed in a television broadcast related to a fantasy sports contest;

identifying an advertisement that offers a prize that matches a level of difficulty of the instant scoring opportunity; and generating for display on the display screen, simultaneously with the fantasy sports contest information, the identified advertisement.

8. The non-transitory computer readable medium of claim 7 wherein the machine-readable instructions for generating the identified advertisement for display comprises machine-readable instructions for generating an interactive advertisement for display.

9. The non-transitory computer readable medium of claim 7 wherein the machine-readable instructions for generating fantasy sports contest information for display comprises machine-readable instructions for displaying fantasy sports contest information related to a requirement for winning the prize in the instant scoring opportunity.

10. The non-transitory computer readable medium of claim 7 further comprising machine-readable instructions for generating for display on the display screen, simultaneously with the fantasy sports contest information and the identified advertisement, the television broadcast related to the fantasy sports contest.

11. The non-transitory computer readable medium of claim 7 further comprising machine-readable instructions for enabling the user to claim the prize through the identified advertisement.

12. The non-transitory computer readable medium of claim 11 further comprising machine-readable instructions for transmitting at least one of a PIN or password to the user for claiming the prize.

13. A system for providing advertisements on a display device to a user using a fantasy sports contest application, the system comprising:
   a user input device;
   a user output device comprising the display device; and
   processing circuitry configured to:
      generate for display on the display device fantasy sports contest information for an instant scoring opportunity that prompts the user to predict the outcome of an event displayed in a television broadcast related to a fantasy sports contest;
      identify an advertisement that offers a prize that matches a level of difficulty of the instant scoring opportunity; and
      generate for display on the display device, simultaneously with the fantasy sports contest information, the identified advertisement.

14. The system of claim 13 wherein the processing circuitry configured to generate the identified advertisement for display comprises processing circuitry configured to display an interactive advertisement.

15. The system of claim 13 wherein the processing circuitry configured to generate fantasy sports contest information for display comprises processing circuitry configured to generate fantasy sports contest information for display related to a requirement for winning the prize in the instant scoring opportunity.

16. The system of claim 13 wherein the processing circuitry is further configured to generate for display on the display device, simultaneously with the fantasy sports contest information and the identified advertisement, the television broadcast related to the fantasy sports contest.

17. The system of claim 13, wherein the processing circuitry is further configured to enable the user to claim the prize through the identified advertisement.

18. The system of claim 17, wherein the processing circuitry is further configured to transmit at least one of a PIN or password to the user for claiming the prize.

* * * * *

UNITED STATES PATENT AND TRADEMARK OFFICE
CERTIFICATE OF CORRECTION

| | | |
|---|---|---|
| PATENT NO. | : 8,505,045 B2 | Page 1 of 1 |
| APPLICATION NO. | : 12/769843 | |
| DATED | : August 6, 2013 | |
| INVENTOR(S) | : Hughes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this
Twenty-first Day of July, 2015

Michelle K. Lee
*Director of the United States Patent and Trademark Office*